US011802065B2

(12) United States Patent
Hansen et al.

(10) Patent No.: US 11,802,065 B2
(45) Date of Patent: Oct. 31, 2023

(54) INDUCED SLUDGE BED ANAEROBIC REACTOR SYSTEM

(71) Applicants: Conly L. Hansen, North Logan, UT (US); Leonard Alan Collins, Smithfield, UT (US); Jaron Conly Hansen, Springville, UT (US)

(72) Inventors: Conly L. Hansen, North Logan, UT (US); Leonard Alan Collins, Smithfield, UT (US); Jaron Conly Hansen, Springville, UT (US)

( * ) Notice: Subject to any disclaimer, the term of this patent is extended or adjusted under 35 U.S.C. 154(b) by 197 days.

(21) Appl. No.: 17/336,814

(22) Filed: Jun. 2, 2021

(65) Prior Publication Data

US 2021/0284557 A1 Sep. 16, 2021

Related U.S. Application Data

(63) Continuation-in-part of application No. 16/746,848, filed on Jan. 18, 2020, now Pat. No. 11,066,315, (Continued)

(51) Int. Cl.
*C02F 3/28* (2023.01)
*C02F 3/00* (2023.01)

(52) U.S. Cl.
CPC .......... *C02F 3/2866* (2013.01); *C02F 3/286* (2013.01); *C02F 3/2846* (2013.01); *C02F 3/006* (2013.01);
(Continued)

(58) Field of Classification Search
CPC ...... C02F 3/2866; C02F 3/2846; C02F 3/286; C02F 3/006; C02F 2203/006;
(Continued)

(56) References Cited

U.S. PATENT DOCUMENTS 2,586,739 A 2/1952 Summers
2,647,733 A 8/1953 Knowles
(Continued)

FOREIGN PATENT DOCUMENTS

CN 107001085 A * 8/2017
DE 10314933 A1 10/2004
(Continued)

OTHER PUBLICATIONS

Machine-generated English translation of CN 107001085, generated on Jan. 30, 2023.*
(Continued)

*Primary Examiner* — Fred Prince
(74) *Attorney, Agent, or Firm* — Collins & Collins Intellectual, LLC; L. Alan Collins

(57) ABSTRACT

An induced sludge bed anaerobic reactor system that includes at least two stages of bioreactor processing, a first-stage feeding system, a second-stage feeding system, a pH balancing system, an effluent recirculation system, a gas management system, at least one nitrogen reduction system, and a controller. In addition, the nitrogen reduction system(s) if configured for reducing an amount of one or more nitrogen compounds in a substrate mixture sufficient to procedure a non-toxic substrate mixture with respect to anaerobic digestion of the non-toxic substrate by the induced sludge bed anaerobic reactor system.

20 Claims, 22 Drawing Sheets

Related U.S. Application Data which is a continuation of application No. 16/058,850, filed on Aug. 8, 2018, now Pat. No. 10,570,043, which is a continuation-in-part of application No. 15/253,727, filed on Aug. 31, 2016, now Pat. No. 10,071,925.

(52) U.S. Cl.
CPC .. *C02F 2203/006* (2013.01); *C02F 2209/005* (2013.01); *C02F 2209/02* (2013.01); *C02F 2209/03* (2013.01); *C02F 2209/06* (2013.01); *C02F 2209/14* (2013.01); *C02F 2209/40* (2013.01); *Y02W 10/37* (2015.05)

(58) Field of Classification Search
CPC ............ C02F 2209/005; C02F 2209/02; C02F 2209/03; C02F 2209/06; C02F 2209/14; C02F 2209/40; Y02W 10/37
USPC ...... 210/603, 604, 605, 608, 614, 903, 96.1, 210/612
See application file for complete search history.

(56) References Cited

U.S. PATENT DOCUMENTS

| | | |
|---|---|---|
| 2,680,602 A | 6/1954 | Nelson |
| 2,889,929 A | 6/1959 | Kivell |
| 3,184,065 A | 5/1965 | Bradford |
| 3,622,009 A | 11/1971 | Bordner |
| 3,705,648 A | 12/1972 | Arvanitakis |
| 3,787,316 A | 1/1974 | Brink |
| 3,837,493 A | 9/1974 | Lin |
| 3,965,013 A | 6/1976 | Jackson |
| 3,988,026 A | 10/1976 | Kemp |
| 4,003,398 A | 1/1977 | Duveau |
| 4,062,549 A | 12/1977 | Kemp |
| 4,208,279 A | 6/1980 | Varani |
| 4,302,329 A | 11/1981 | Pfefferkorn |
| 4,350,588 A | 9/1982 | Tsubota |
| 4,354,936 A | 10/1982 | Ishida |
| 4,372,856 A | 2/1983 | Morrison |
| 4,396,402 A | 8/1983 | Ghosh |
| 4,519,848 A | 5/1985 | Underwood |
| 4,609,460 A | 9/1986 | Vellinga |
| 4,663,043 A | 5/1987 | Molin et al. |
| 4,696,746 A | 9/1987 | Ghosh |
| 4,696,747 A | 9/1987 | Verstraete |
| 4,758,344 A | 7/1988 | Wildenauer |
| 4,822,056 A | 4/1989 | Bowers |
| 4,840,732 A | 6/1989 | Rawlins |
| 4,919,813 A | 4/1990 | Weaver |
| 5,039,111 A | 8/1991 | Kemp |
| 5,143,625 A | 9/1992 | Ballard |
| 5,290,450 A | 3/1994 | Kobayashi |
| 5,338,447 A | 8/1994 | Vellinga |
| 5,409,610 A | 4/1995 | Clark |
| 5,441,634 A | 8/1995 | Edwards |
| 5,464,539 A | 11/1995 | Ueno |
| 5,507,946 A | 4/1996 | Stearns |
| 5,529,692 A | 6/1996 | Kubler |
| 5,582,733 A * | 12/1996 | Desbos ................. C02F 3/085 210/219 |
| 5,660,724 A | 8/1997 | Pollock |
| 5,670,047 A | 9/1997 | Burke |
| 5,747,311 A | 5/1998 | Jewell |
| 5,798,043 A | 8/1998 | Khudenko |
| 5,866,002 A | 2/1999 | Yates |
| 6,063,273 A | 5/2000 | Habets |
| 6,193,409 B1 | 2/2001 | Brunson |
| 6,207,047 B1 | 3/2001 | Gothreaux |
| 6,391,203 B1 * | 5/2002 | Fassbender ............ C12M 23/36 210/603 |
| 6,416,993 B1 | 7/2002 | Wexler |
| 6,592,751 B2 | 7/2003 | Haridas |
| 6,613,562 B2 | 9/2003 | Dvorak |
| 6,860,996 B2 | 3/2005 | Noike |
| 6,911,149 B2 | 6/2005 | Hansen |
| 6,916,025 B2 | 7/2005 | Brisson |
| 7,022,293 B2 | 4/2006 | Hogan |
| 7,290,669 B1 | 11/2007 | Hansen |
| 7,435,349 B2 * | 10/2008 | You ......................... C02F 3/30 210/615 |
| 7,452,467 B2 | 11/2008 | Hansen |
| 7,540,961 B2 | 6/2009 | Hansen |
| 7,615,155 B1 | 11/2009 | Hansen |
| 7,699,976 B2 | 4/2010 | Hansen |
| 7,727,396 B1 | 6/2010 | Hansen |
| 8,894,855 B2 | 11/2014 | Liu et al. |
| 2002/0079266 A1 | 6/2002 | Ainsworth et al. |
| 2002/0117443 A1 | 8/2002 | Bailey |
| 2002/0162795 A1 | 11/2002 | Pollock |
| 2005/0064567 A1 | 3/2005 | Lay |
| 2005/0194310 A1 | 9/2005 | Yamamoto et al. |
| 2006/0060524 A1 | 3/2006 | Chynoweth |
| 2006/0065593 A1 | 3/2006 | Hansen |
| 2006/0289355 A1 | 12/2006 | Hansen |
| 2009/0107913 A1 | 4/2009 | Johnson |
| 2009/0123965 A1 | 5/2009 | Wahl |
| 2010/0032370 A1 | 2/2010 | Allen et al. |
| 2010/0078307 A1 | 4/2010 | Dale et al. |
| 2010/0133176 A1 | 6/2010 | Hansen |
| 2011/0100902 A1 | 5/2011 | Bluvol et al. |
| 2012/0006744 A1 | 1/2012 | Phattaranawik et al. |
| 2012/0094350 A1 | 4/2012 | Raap et al. |
| 2015/0076058 A1 | 3/2015 | Brooks et al. |
| 2015/0329399 A1 | 11/2015 | Kumar et al. |
| 2016/0002582 A1 | 1/2016 | Lin et al. |
| 2016/0186072 A1 | 6/2016 | Lehoux et al. |

FOREIGN PATENT DOCUMENTS

| | | | |
|---|---|---|---|
| JP | 64-22398 A | | 1/1989 |
| JP | 2002-061752 A | | 2/2002 |
| JP | 2003-071498 A | | 3/2003 |
| JP | 2005-169329 A | * | 6/2005 |
| JP | 4001507 B2 | | 10/2007 |
| JP | 2007-289946 A | * | 11/2007 |
| JP | 2012-35197 A | * | 2/2012 |
| WO | WO 03/035560 A1 | * | 5/2003 |

OTHER PUBLICATIONS

Machine-generated English translation of JP 2007-289946, generated on Jan. 30, 2023.*
Machine-generated English translation of JP 2005-169329, generated on Jan. 30, 2023.*
Machine-generated English translation of JP 2012-35197, generated on Jan. 31, 2023.*

* cited by examiner

INDUCED SLUDGE BED ANAEROBIC REACTOR SYSTEM

RELATED APPLICATION(S)

This application is a Continuation in Part and claims benefit from or priority of U.S. patent application Ser. No. 16/746,848 that was filed Jan. 18, 2020, which is a Continuation of and claims benefit from or priority of U.S. patent application Ser. No. 16/058,850 (U.S. Pat. No. 10,570,043) that was filed Aug. 8, 2018 (issued Feb. 25, 2020), which is a Continuation in Part of U.S. patent application Ser. No. 15/253,727 (U.S. Pat. No. 10,071,925), filed Aug. 31, 2016 (issued Sep. 11, 2018), each of which is incorporated herein by reference in its entirety.

SUMMARY

The summary provided in this section summarizes one or more partial or complete example embodiments of the technologies described herein in order to provide a basic high-level understanding to the reader. This summary is not an extensive description of the technologies, is not limiting, and it may not identify key elements or aspects of the technologies, or delineate the scope of the technologies. Its sole purpose is to present various aspects of the technologies in a simplified form as a prelude to the detailed description provided below. The technologies as a whole shall not be limited to any particular embodiment(s) or example(s) or combination(s) therefore provided herein.

This invention relates to anaerobic digestion of substrate in wastewater. More particularly, this invention relates to processes and devices to enhance and improve the anaerobic digestion process, to minimize bacteria loss and reactor plugging, to protect against biogas overpressure, and to reduce mechanical complexity and maintenance needs. In general, this invention comprises an induced sludge bed anaerobic reactor system that typically includes at least two stages of bioreactor processing, a first-stage feeding system, a second-stage feeding system, a pH balancing system, an effluent recirculation system, a gas management system, at least one nitrogen reduction system, and a controller. In addition, any given stage of bioreactor processing may be comprised of a plurality of reactors that are configured to operate in parallel with each other.

The foregoing and other features, utilities, and advantages of the invention will be apparent from the following detailed description of the invention with reference to the accompanying drawings.

DESCRIPTION OF THE DRAWINGS

The detailed description provided below will be better understood when considered in connection with the accompanying drawings, where.

Like-numbered labels in different figures are typically used to designate similar or identical elements or steps in the accompanying drawings.

DETAILED DESCRIPTION

Figure 1:
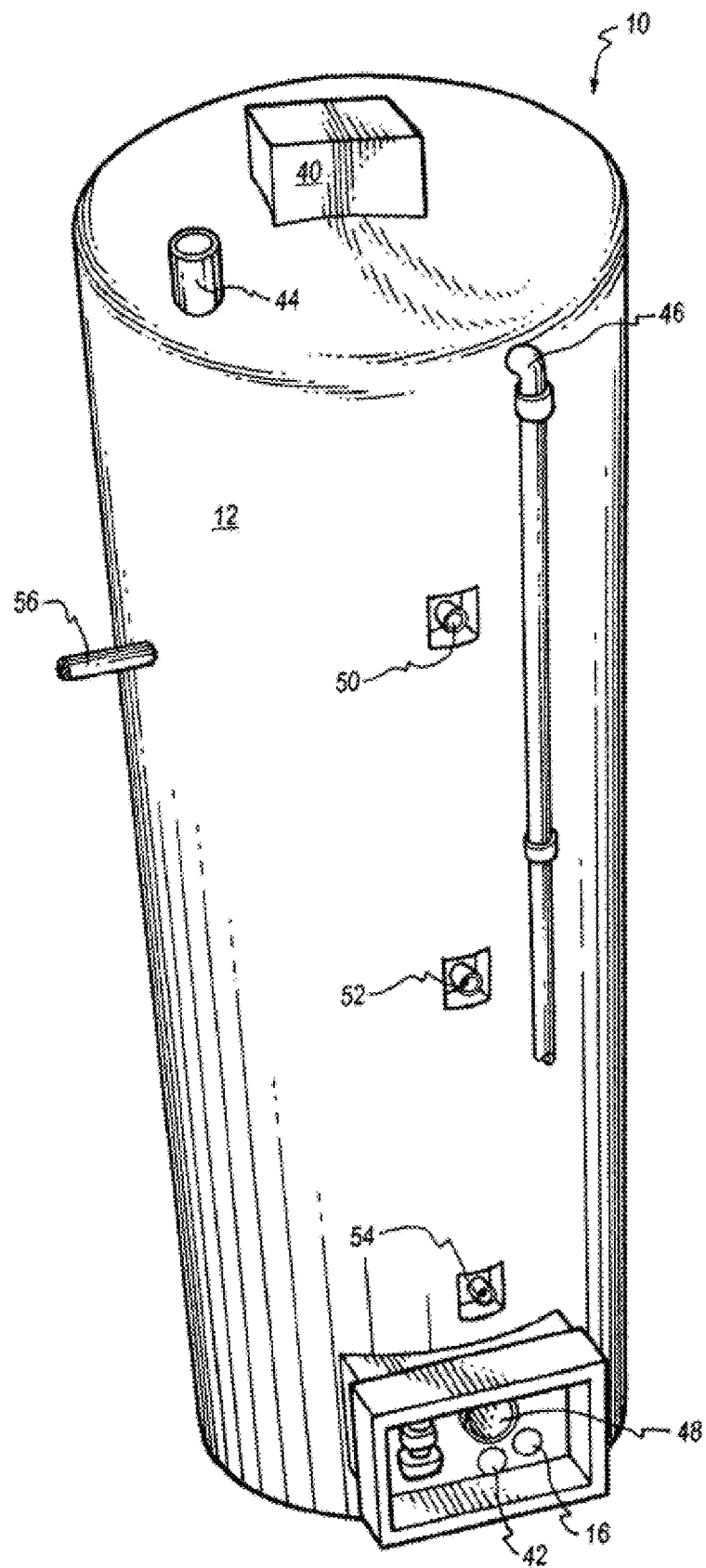
FIG. 1 is a perspective view of an example bioreactor according to the present invention.

The detailed description provided in this section, in connection with the accompanying drawings, describes one or more partial or complete example embodiments of the technologies, but is not intended to describe all possible embodiments of the technologies. This detailed description sets forth various examples of at least some of the systems and/or methods of the technologies. However, the same or equivalent technologies, systems, and/or methods may be realized according to examples as well.

The present invention relates to an anaerobic reactor 10 comprising an enclosure or vessel in which wastewater containing high concentrations of organic matter is introduced for treatment. An anaerobic reactor 10 according to the present invention is particularly applicable to wastewater generated through agricultural production and food processing.

In the anaerobic digestion process, bacteria convert carbon-containing waste products, such as byproducts of farming, ranching, or food processing, into primarily biogas that is similar to natural gas. Suspended growth anaerobic digesters, such as lagoons or enclosed vessels, that are mixed and heated do not retain bacteria. Therefore, the rate of treatment depends on how fast the bacteria can grow. For simplicity, the term "bacteria" as used herein includes acidogens (producers of volatile organic acids), methanogens (producers of methane), and other microorganisms that may not technically be classified as bacteria, such as archaeon-methanogens that are generally considered to be a primitive form of bacteria, but that may contribute to the anaerobic digestion processes along with true bacteria.

An induced bed bioreactor ("IBR") quickly forms a sludge bed within the bioreactor. A sludge bed refers to a region within a bioreactor that is thick with solids and a high concentration of living bacteria feeding on the solids. The sludge bed initially consists of various types of solid particles naturally found in biowaste, such as undigested feed or pieces of bedding. A sludge bed of this type is a haven for bacteria. The bacteria will attach to the particles of waste in the wastewater.

If the sludge bed is controlled properly, the bacteria will grow without being flushed out of the bioreactor. If the sludge bed is managed properly, it will evolve to comprise mostly living bacteria and the solids upon which the bacteria feed. When the sludge bed is trapped in a zone, the living bacteria multiply by consuming the solid, non-living material suspended in the bed and that flows up into the bed from feeding the bioreactor. Without some type of sludge bed control mechanism, however, the wastewater passing through a continuously fed bioreactor would transport bacteria out of the bioreactor with the effluent. This is not desirable because a high concentration of bacteria is necessary to effectively convert organic matter in the wastewater to biogas.

Prior bioreactors have been developed to provide a high concentration of bacteria to enhance the anaerobic digestion process. These prior bioreactors have added a fixed media, such as plastic rings or rocks, so that the bacteria have something to which they can attach. A drawback of these prior bioreactors, however, is that they soon plug when processing substrates, the food for the microorganisms, such as animal manure and many kinds of food processing wastes. They also employ no mechanism to control formation of the sludge bed.

Figure 2:
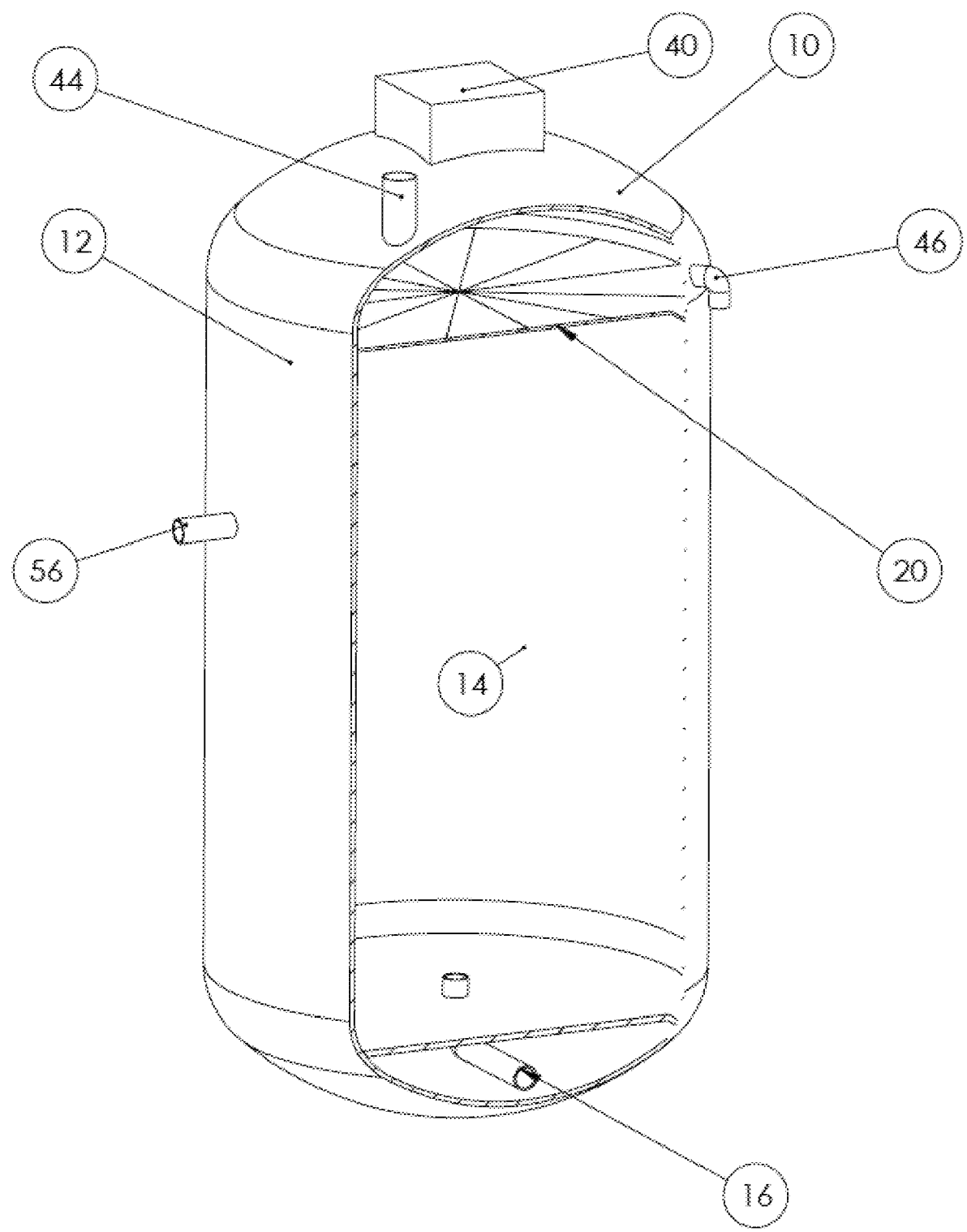
FIG. 2 is a front elevation view, including a sectional view showing interior portions, of the example bioreactor.

FIGS. 1-2 illustrate various views of example bioreactor 10 that comprises a vessel or tank 12, which typically comprises a cylindrical upstanding tank. The vessel 12 may be made of any suitable material, including but not limited to steel, plastic, or concrete. The vessel 12 provides an enclosure into which wastewater 14 is fed. In one example, the vessel 12 is round in cross section and two to five times taller than its diameter. Other examples may take on other shapes and/or proportions. The wastewater to be processed or treated in vessel 12 may comprise any type of biological waste products (also known as "substrate"), such as byproducts of farming, ranching, agriculture, food processing, or any other type of wastewater that contains high concentrations of organic matter. Wastewater 14 is typically introduced (fed into) at or near the bottom of vessel 12 through a substrate inlet 16. The introduction of wastewater containing substrates is typically known as 'feeding'—that is, the wastewater is fed into the bioreactor. The wastewater may also include other waste materials, such as wood chips, bedding material, straw, baling twine, rocks, dirt, and other materials commonly found in animal manure, agricultural byproducts, and food waste. The term "wastewater" as used herein is typically synonymous with the term "substrate mixture" as used herein.

FIG. 2 illustrates aspects of an example partition or septum 20 that is positioned inside vessel 12. In one example, septum 20 is disposed between approximately two-thirds and nine-tenths of the way up in vessel 12. The septum may be rigid or semi-rigid, and may be comprised of any suitable material, such as plastic, metal, or the like. It is also to be understood that the septum 20 may comprise a plurality of panels or parts, or may comprise a single, unitary piece of material. In another example, a plurality of septums 20 of similar or different designs may be layered one atop another. The space between layered septums may vary from two septums being stacked one immediately atop another to having any desired spacing between one septum and another, and any combination of the foregoing. In general, the objective of layering septums of similar and/or different types as described here is to maximize the degree to which bacteria are prevented from exiting the vessel 12 while at the same time minimizing clogging.

Septum 20 may also help form and maintain the sludge bed below septum 20 to retain anaerobic bacteria within the bioreactor. By retaining the anaerobic bacteria within the sludge bed area or zone, there remain more bacteria for breaking down the organics in the wastewater fed into the bioreactor. By utilizing an effective septum, such as septum 20, wastewater can be treated much faster and much more efficiently in the apparatus described in connection with the present invention as compared to other prior bioreactors. This increases efficiency of operations and reduces capital costs, required maintenance and management, and makes it easier to build and scale. The present invention also makes it much easier for an inexperienced operator to manage the anaerobic digester without having to know how the anaerobic digester actually works.

With reference again to FIG. 1, several different ports may be provided in bioreactor 10. When sludge builds up toward the bottom of the bioreactor, a port 42, which may be of any suitable size, is provided for cleaning out unwanted, sludge mixed with grit or sand or the like. A top access port 44, which may be of any suitable size, may be provided at the top of vessel 12 for added accessibility to the top of the enclosure 12. A vent or gas outlet 46 formed at the top of vessel 12 may be utilized to remove biogas generated within bioreactor 10. A lower access port 48 (closed during normal operation), which can be of any suitable size, may be provided toward the lower end of the vessel 12 for access to the lower portion of vessel 12. A recirculation port 50 may be provided to redirect sludge and/or wastewater above septum 20 to the lower portion of vessel 12, either through substrate inlet 16 or through any other return line or port (not shown). Test ports 52, 54 may be provided to test the wastewater or sludge bed at any number of locations relative to the vertical orientation of the tank. An effluent outlet 56 may be provided to remove water that has passed through the continuously fed bioreactor. Preferably, water passing through effluent outlet 56 will be treated wastewater that contains little bacteria. Cap 40 may not be significant to or required in the examples described herein. Those skilled in the art will understand that any number of other outlets or ports may be utilized in connection with the present invention without departing from the scope or spirit thereof.

Research suggests that the design of an effective septum depends on an understanding of the anaerobic digestion process and the bacteria involved in that process. The anaerobic digestion process is complex, involving various types of bacteria that work symbiotically, each playing a role in the breakdown of organics and the generation of methane and/or hydrogen. Anaerobic digestion can roughly be broken down into three stages: (1) hydrolysis, (2) acidogenesis, and (3) methanogenesis. Specific types of bacteria are typically required for each stage of the process, and are known to those skilled in the art. In one example of a properly operating anaerobic digester, hydrolyzing bacteria break down larger substrate molecules which are then further broken down by acidogens into volatile organic acids (VOAs). The VOAs are then consumed by the methanogens, which are known to produce methane as a byproduct.

Acidogens tend to be faster growing than other types of anaerobic bacteria in most situations. This means that most anaerobic digesters must be relatively lightly loaded with substrate to prevent acidogens from outgrowing the methanogens and thus producing more VOA than the methanogens can consume. If they do not, the pH ("potential of hydrogen") will drop into the acidic range, which inhibits methanogens and builds up acid in a downward spiral until no acids are removed and the digester fails. This means that a limited amount of substrate (i.e., organic matter in wastewater) can be added to most anaerobic digesters in any given time period so that processes of hydrolysis and acid production do not outstrip the ability of methanogens to utilize the VOA and thus the pH will be maintained near the neutral range and the system is kept in balance.

Figure 3:
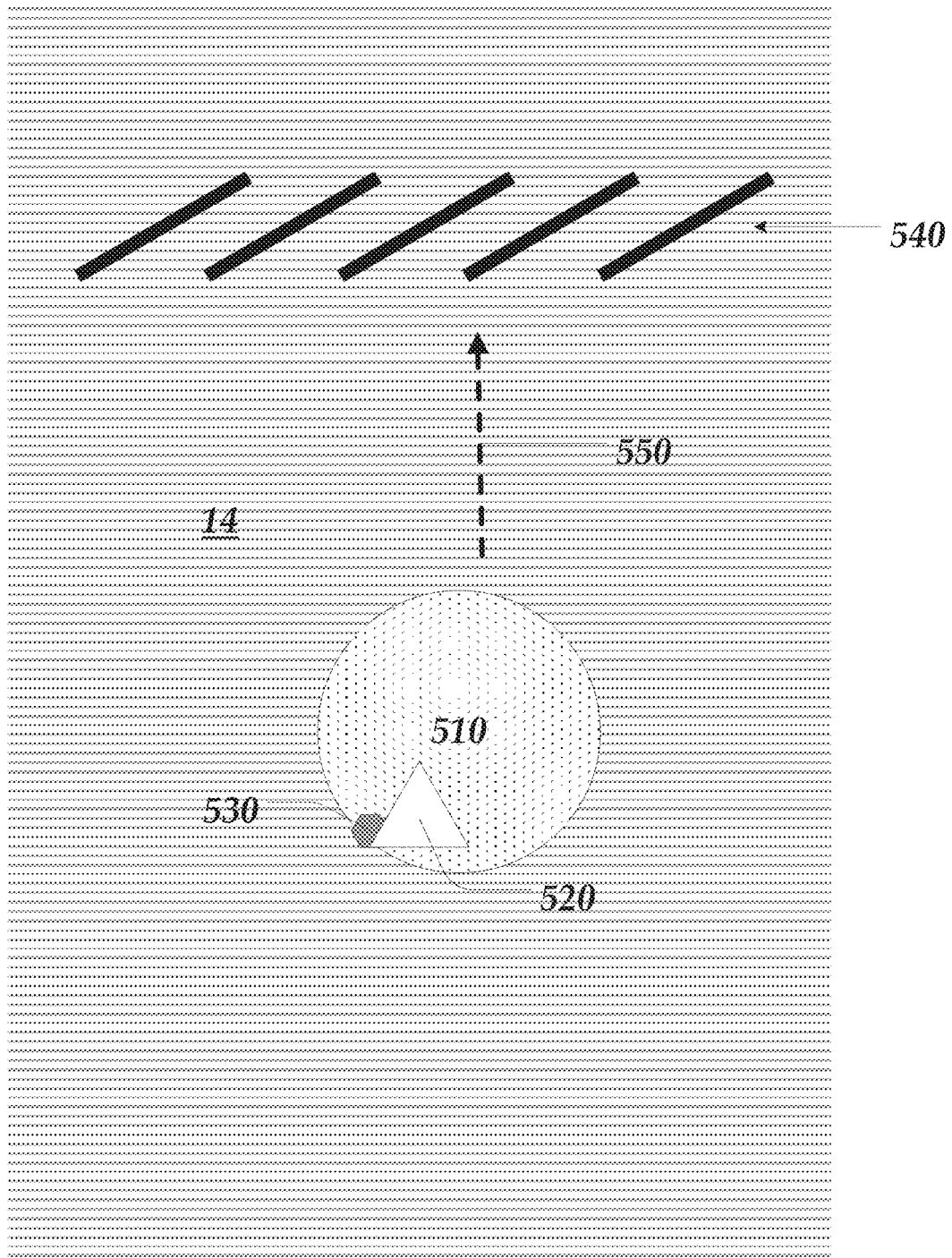
FIG. 3 is a representation of a waste particle, a bacterium, a gas bubble, and the interaction of these with a septum of the present invention.

As schematically represented in FIG. 3, a bacterium 520 will typically attach to a particle of waste 530 in wastewater 14 within an anaerobic digester. Such waste particles 530 are generally referred to herein as "substrate" that are broken down or digested by bacteria. As gas bubble 510 is produced by bacterium 520 the gas bubble tends to remain attached to the bacterium causing it and any waste particle 530 to which it is attached to rise 550 upward at some point in the gas bubble's growth. If nothing stops this upward movement, bacterium 520 may reach the top of wastewater 14 and exit vessel 12 with the effluent. Further, bacteria tend to clump together such that bacteria in a clump rise 550 together. Note that 520 may also represent a clump of bacteria, 530 multiple food particles (substrate), and 510 multiple or joined gas bubbles. Note that not all types of bacteria in an anaerobic reactor necessarily produce gas bubbles, but it is known that methanogens tend to produce methane gas bubbles.

An effective septum design will prevent or minimize rising bacteria from exiting the vessel. For example, rising bacterium/clump of bacteria 520 will bump into the septum causing any bubbles 510 to dislodge and continue upward while causing the bacteria 520 and any attached waste particles 530 to fall back into the sludge bed. On the other hand, a less-effective septum design will allow rising bacterium/clump of bacteria to exit vessel 12. For example, at least the aperture of the septum design disclosed in U.S. Pat. No. 7,452,467, may allow undesirable quantities of bacteria to exist vessel 12.

In one more effective design example, septum 20 includes example vanes 540 (not to scale) that serve to impede the upward movement of rising bacteria. As a result, rising bacterium 520 typically bump into one of the vanes such that bubble(s) 510 dislodges, allowing bacterium 520 and any attached waste particle 530 to fall back into the sludge bed, and also allowing bubble(s) 510 to pass through septum 20 and out of vessel 12 through gas outlet 46 or the like. In one example, vanes 540 of septum 20 are sized and positioned relative to each other so as to maximize the probability that rising bacteria 520 will bump into a vane thus dislodging any bubbles 510, causing the bubble-less bacteria 520 to fall back into the sludge bed before they can exit bioreactor 10.

Some types of waste fed into bioreactor 10 may also float to the top of vessel 12, including wood chips, bedding material, straw and baling twine; materials commonly found in animal manure, agricultural byproducts, and food production waste. Rocks, dirt and sand tend to sink. In addition to or instead of floating, such waste may be moved to the top of vessel 12 due to wastewater turbulence and the like in vessel 12. Such waste is referred to herein as "clogging waste" that bacteria has not yet broken down or that may not be able to break down. Such clogging waste may come in all shapes and sizes, some of which may float or rise in wastewater 14 and contribute to clogging of bioreactor 10. Given such clogging waste, vanes 540 of septum 20 are sized and oriented relative to each other so as to minimize the probability that floating waste will clog bioreactor 10, as described in more detail in connection with FIG. 4. The terms "clog" and "plug" and the like as used herein refer to a buildup(s) of clogging waste that result in a substantial reduction of the flow of the biogas produced within vessel 12. This buildup may occur in one or more ports of the bioreactor, in the septum itself, and/or in any other part(s) of the bioreactor that can result in clogging. The terms "clogging" and "plugging" and the like as used herein refer to the forming of a clog or plug within vessel 12. For example, real-world usage of the septum design disclosed in U.S. Pat. No. 7,452,467 reveals that the aperture of the septum may be clogged by waste, even when using the auger and mixer components disclosed.

Figure 4:
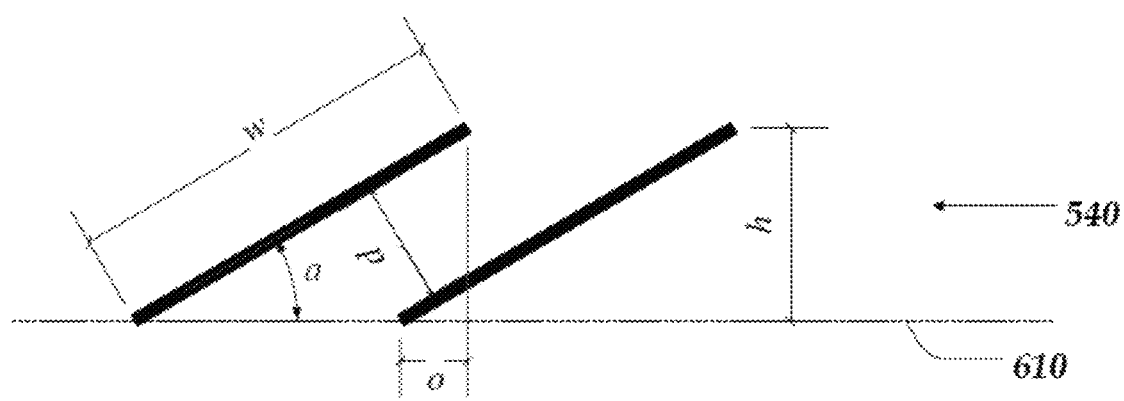
FIG. 4 illustrates a length-wise sectional view of an example pair of adjacent vanes of an example septum.

FIG. 4 illustrates a length-wise sectional view of an example pair of adjacent vanes 540 of an example septum and further illustrates characteristics of the pair that are generally shared by essentially all pairs of adjacent vanes of a more effective septum design. In particular, dimension w indicates the width of the vanes, angle a indicates the angle of the vanes relative to horizontal plane 610, dimension p indicates the parallel distance between the vanes, dimension o indicates the overlap distance of the vanes relative to horizontal plane 610, and distance h indicates the vertical height of the vanes relative to horizontal plane 610.

An effective septum will minimize bacteria loss—the amounts of bacteria that exit bioreactor 10 during operation—and will also minimize clogging of bioreactor 10. In general, as bacteria loss and clogging approach zero, the more effective septum 20 is. This effectiveness is typically a function of characteristics of adjacent pairs of the septum's vanes in terms of w, p, o, a, and h. In one example, for an effective septum design, each vane is substantially w in width and is oriented at angle a relative to imaginary horizontal plane 610 of septum 20 on which a lower edge of each vane is situated. Any two adjacent vanes are physically oriented relative to each other such that vane width w, angle a, and parallel distance p provide a minimum overlap distance o. Parallel distance p is typically selected to be greater than the maximum rigid dimension of clogging waste anticipated to enter bioreactor 10. Further, vane width w, angle a, and parallel distance p are typically selected to provide at least a minimum overlap distance o that is greater than zero. In one example, dimension w is one to three times the parallel distance p, angle a is 45 degrees or less, and the overlap distance o is zero and three-fourths the width w. The term "maximum rigid dimension of clogging waste" typically refers a cross-sectional dimension of clogging waste that is sufficiently large and rigid to cause the waste to lodge between vanes or the like of a septum. For example, consider a clogging waste cross-section with a maximum rigid dimension that is greater than p, such a maximum rigid dimension is considered sufficient to cause the waste to lodge between vanes or the like of a septum. Alternatively, consider a clogging waste cross-section with a maximum dimension that is greater than p but that is not sufficiently rigid. Such clogging waste may deform along the dimension due to its lack of rigidity such that it will not lodge between vanes or the like of a septum. Thus, the term refers to both sufficient dimension and rigidity for lodging between vanes or the like of a septum.

In another example, the minimum overlap distance o is selected to be sufficient to maximize the probability that rising bacteria that reach the septum will bump into a vane as opposed to passing through the septum un-obstructed, thus causing any bubbles to dislodge and the bacteria to fall back into the sludge bed as opposed to exiting bioreactor 10 in the effluent. Note that the rise of floating bacteria may not be 100% vertical; turbulence and currents and the like in the wastewater may cause at least horizontal movement of rising bacteria. Thus, in one example, the minimum overlap distance o is selected to be greater than the anticipated horizontal movement of rising bacteria over distance h.

Given that parallel distance p has a significant influence on vane width w and overlap distance o, and given that parallel distance p is generally selected to be greater than the maximum rigid dimension of clogging waste anticipated to enter bioreactor 10, in one example a macerator 710 is coupled to inlet 16 through which the substrate 722 enters bioreactor 10. Macerators, as known by those skilled in the art, are used to break up solids and the like, such as substrate 722, so as to substantially ensure the maximum size of any solids or the like passing through the macerator. Thus, a macerator(s) can be used to limit the maximum rigid dimension of substrate (including clogging waste) that enters bioreactor 10 to a particular maximum size.

Note that in certain configurations the vane width is may vary along the length of the vanes, such as in the radial vane configuration detailed below. In other septum configurations, such as the linear and concentric vane configurations detailed below, the vane width w may remain substantially constant over the length of the vanes.

In some examples, septum 20 may be conical in shape; that is, raised from the side walls of the vessel 12 to septum apex 80. For example, the elevation between the periphery of septum 20 and septum apex 80 may be approximately ten to twenty inches. However, according to other examples, the elevation between the periphery of septum 20 at the walls of the vessel 12 and a septum apex may be relatively shallow. For example, according to some embodiments, the elevation between the periphery of septum 20 and the apex may be approximately one to three inches. A more flat or shallow septum 20 may facilitate higher bacteria concentrations in the vessel 12 by holding more of the bacteria in the lower portion 750 of vessel 12.

Figure 5:
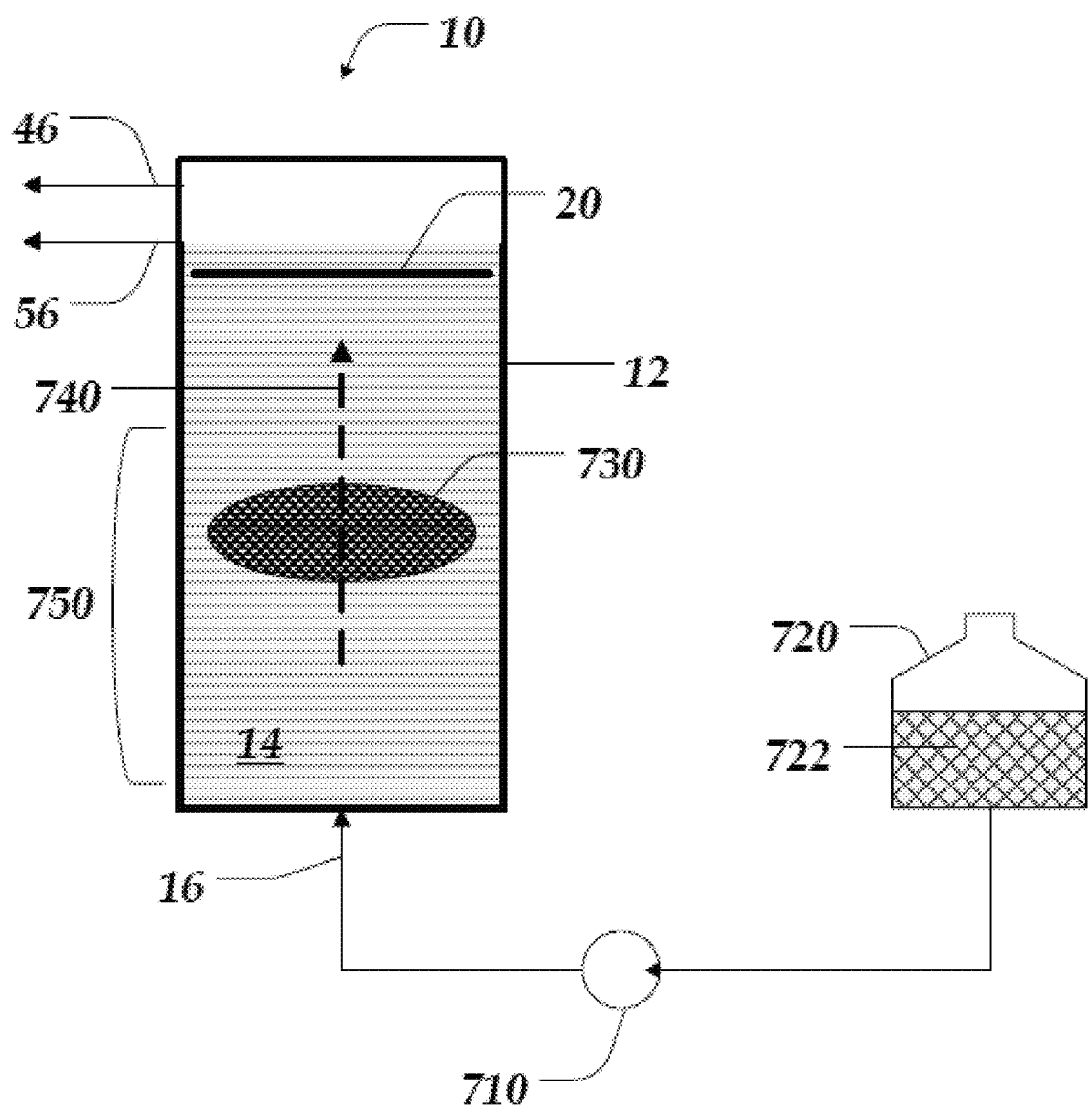
FIG. 5 illustrates a schematic diagram of examples including bioreactor and substrate tank.

FIG. 5 illustrates a schematic diagram of examples including bioreactor 10 and substrate tank 720 comprising substrate 722 that is fed into vessel 12 via substrate inlet 16 through a macerator 710 which breaks up the substrate so as to limit the maximum rigid dimension of substrate 722 (including any clogging waste in the substrate) that enters bioreactor 10 to a particular maximum size. Further illustrated is a representation of a sludge bed 730 induced in a lower portion 750 of vessel 12 and suspended in wastewater 14. The lower portion 750 of vessel 12 is located in an area of vessel 12 below effluent outlet 56 and septum 20 and further located in the area of vessel 12 above substrate inlet 16. Arrow 740 indicates an overall up-flow generated in wastewater 14 from substrate 722 entering vessel 12 through inlet 16, effluent exiting vessel 12 via effluent outlet 56 and biogas 12 rising in wastewater 14 and exiting vessel 12 via biogas outlet 46. Septum 20 is typically situated within wastewater 14 above inlet 16 and sludge bed 730 (i.e., above lower portion 750) and below effluent outlet 56. In one example, septum 20 operates to retain sludge bed 730 in lower portion 750 while minimizing bacteria loss from and clogging of bioreactor 10. In other examples, multiple septums (typically oriented one above another) are so used.

Figure 6:
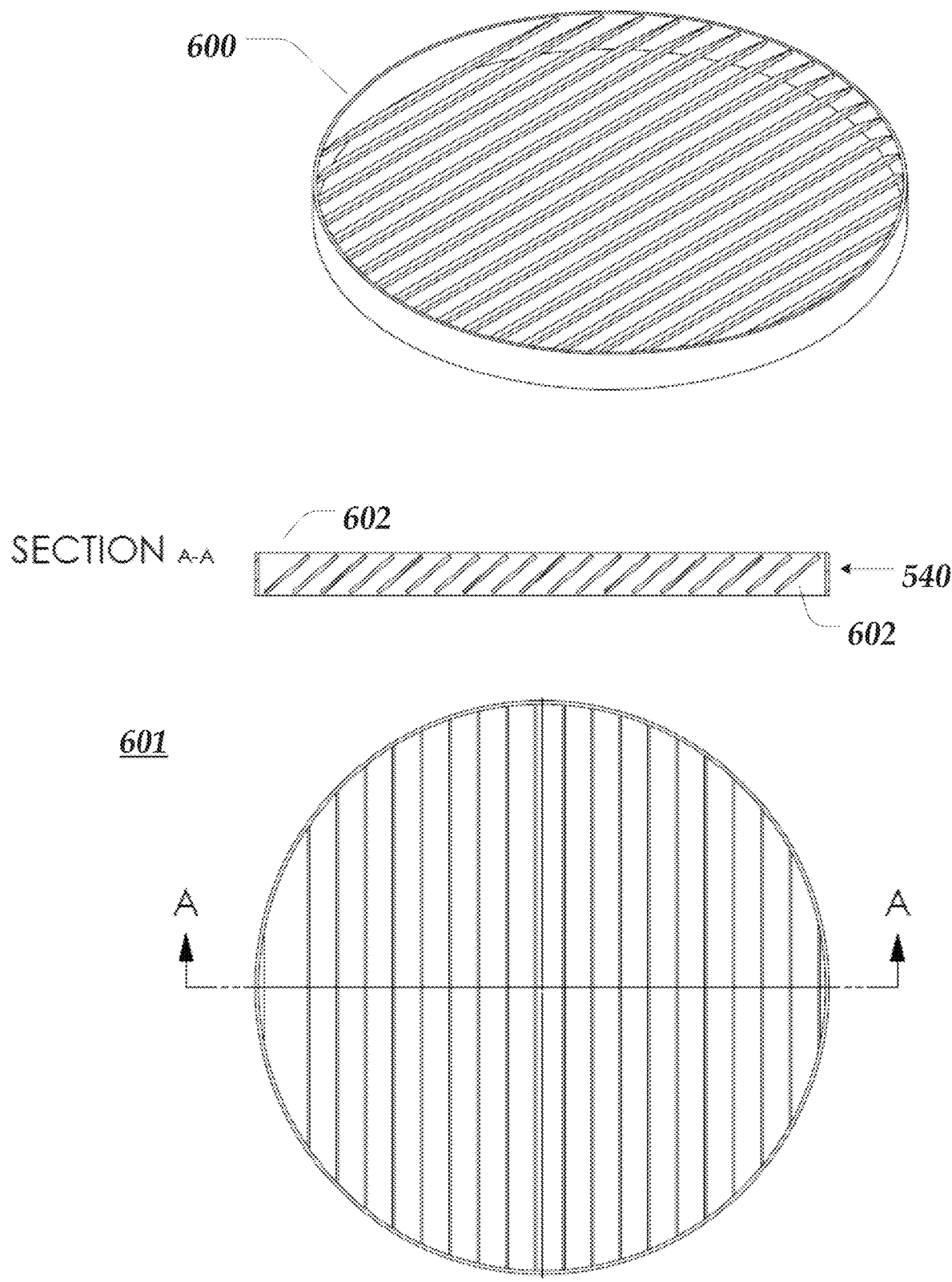
FIG. 6 illustrates an example septum based on a linear vane design.

FIG. 6 illustrates an example septum 600 based on a linear vane design, which is a specific type of example septum 20. An example three-dimensional view 600 of a linear-vane septum is illustrated. In this example design, the vanes are substantially straight and are oriented so as to be substantially parallel to each other, as can be seen in the top and sectional views of illustration 601. In particular with this linear vane design, the characteristics of the adjacent pairs of vanes 540 are maintained consistent with those described in connection with FIG. 4. Further, the septum ends 602 are typically plugged or otherwise structured so as to not allow rising bacteria to pass through the septum 700 unobstructed consistent with the considerations discussed with respect to FIG. 4.

Figure 7:
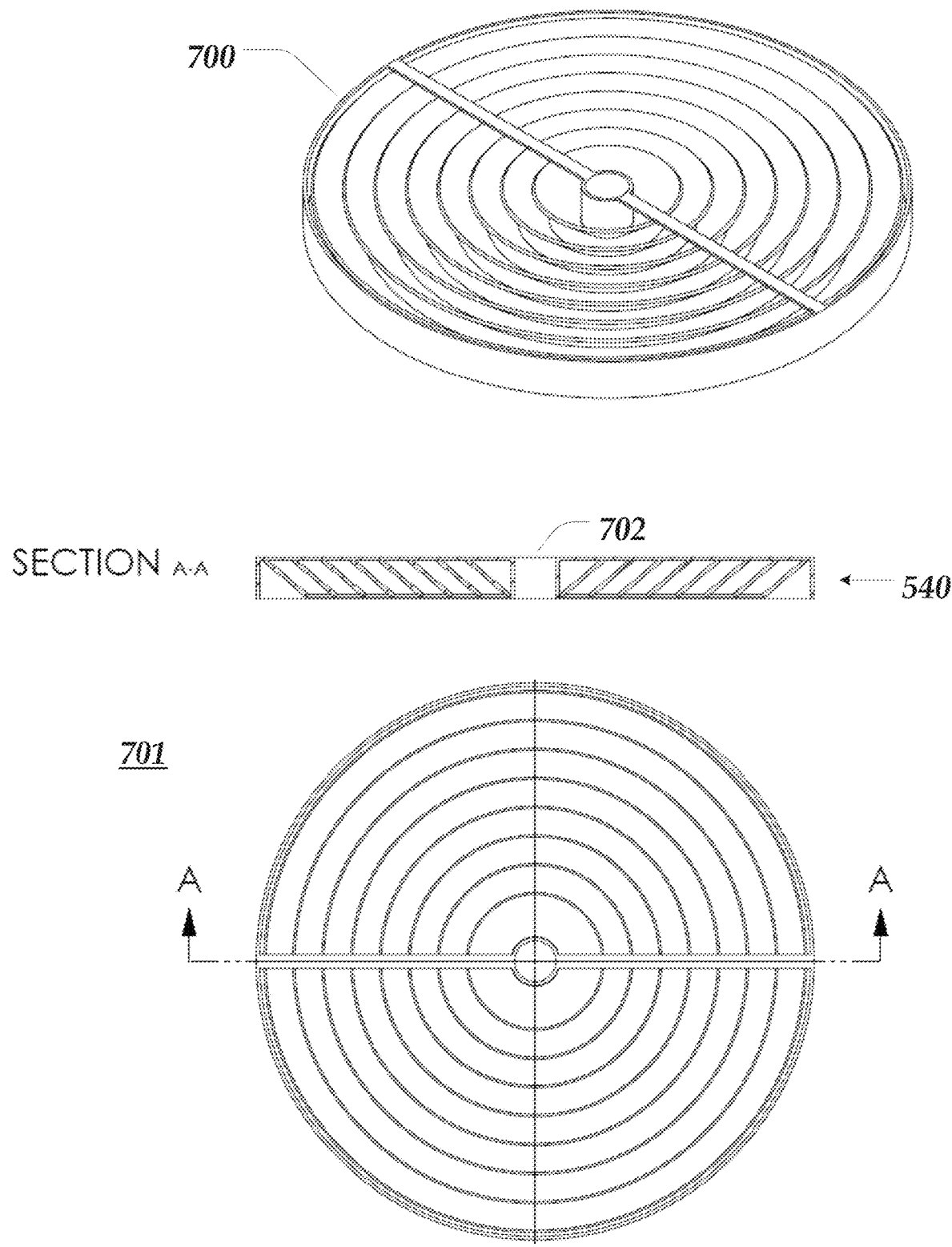
FIG. 7 illustrates an example septum based on a concentric vane design.

FIG. 7 illustrates an example septum 700 based on a concentric vane design, which is a specific type of example septum 20. An example three-dimensional view 700 of a concentric-vane septum is illustrated. In this example design, the vanes are oriented in concentric circles, as can be seen in the top and sectional views of illustration 701. In particular with this concentric vane design, the characteristics of the adjacent pairs of vanes 540 are maintained consistent with those described in connection with FIG. 4. Further, the septum center region 702 is typically plugged or otherwise structured so as to not allow rising bacteria to pass through the septum 700 unobstructed consistent with the considerations discussed with respect to FIG. 4.

Figure 8:
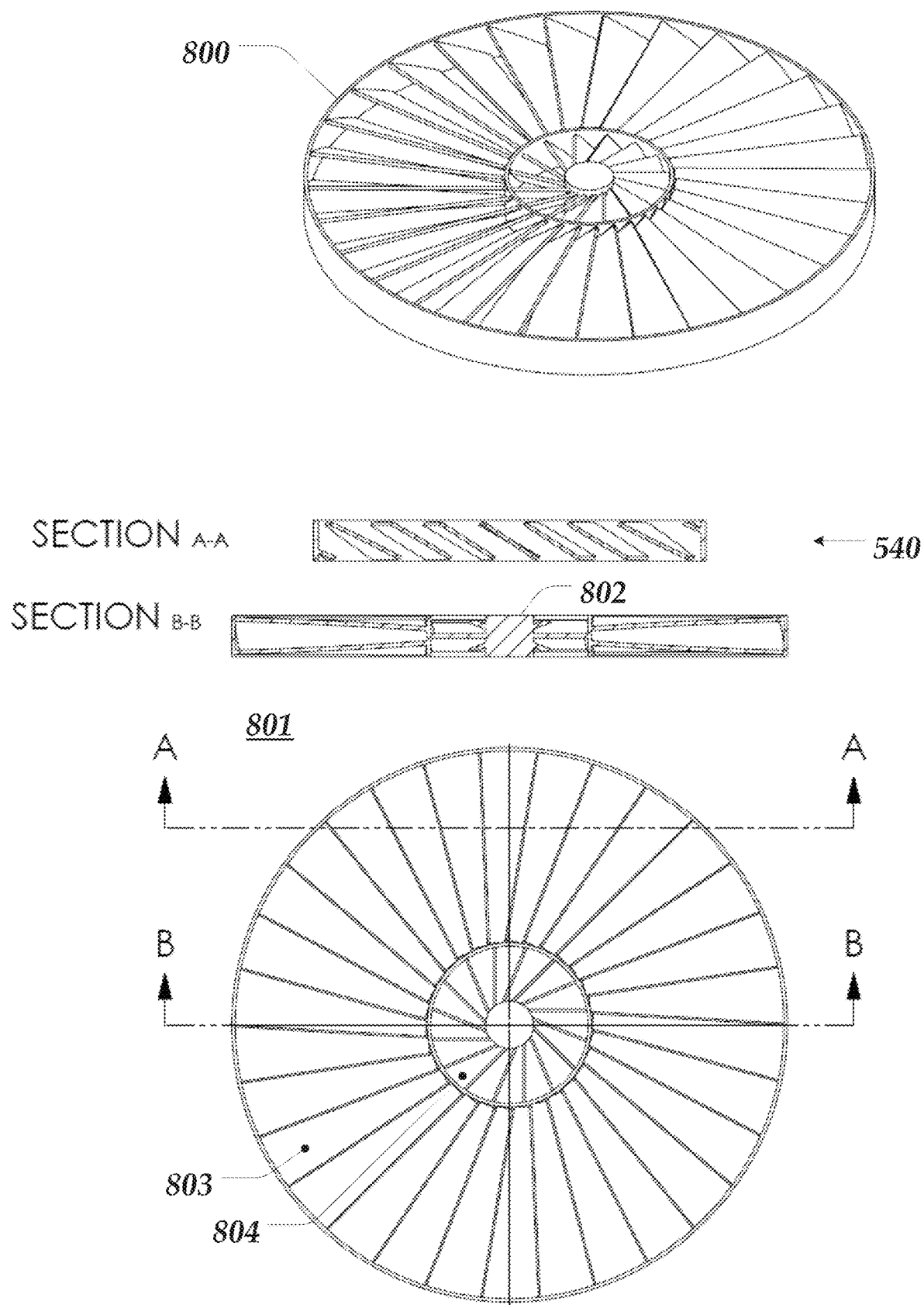
FIG. 8 illustrates an example septum based on a radial vane design.

FIG. 8 illustrates an example septum 800 based on a radial vane design, which is a specific type of example septum 20. An example three-dimensional view 800 of a radial-vane septum is illustrated. In this example design, the vanes are oriented so as to extend out radially from the center region of each section to an outside edge of the section, as can be seen in the top and sectional views of illustration 801. In particular, with this radial vane design, the characteristics of the adjacent pairs of vanes 540 are maintained consistent with those described in connection with FIG. 4. Further, the septum center region 802 is typically plugged or otherwise structured so as to not allow rising bacteria to pass through the septum 800 unobstructed consistent with the considerations detailed with respect to FIG. 4.

In addition, a radial-vane septum 800 may include one or more sections, such as example sections 803 and 804 illustrated in FIG. 8. The number of sections in the radial vane design typically depends on the length of the vanes with respect to a maximum desired septum height h. Note that in the radial vane design the vanes are not actually parallel. Instead, the distance p increases between the vanes over their length from a section center region to a section outside edge. As the vanes become longer their widths w and/or angles a typically need to increase/change so as to maintain the minimum overlap distance o of the characteristics of adjacent pairs of vanes 540 described in connection with FIG. 4. As the length of the vanes increase, the vane width w may become sufficiently large so as to increase the height h of the septum 800 greater than is desirable. To avoid this problem, any number of additional sections can be implemented in a single septum. In general, the number of sections implemented would be at least the number required to not exceed a desired septum height h while still maintaining the adjacent vane characteristics described in connection with FIG. 4.

Figure 9:
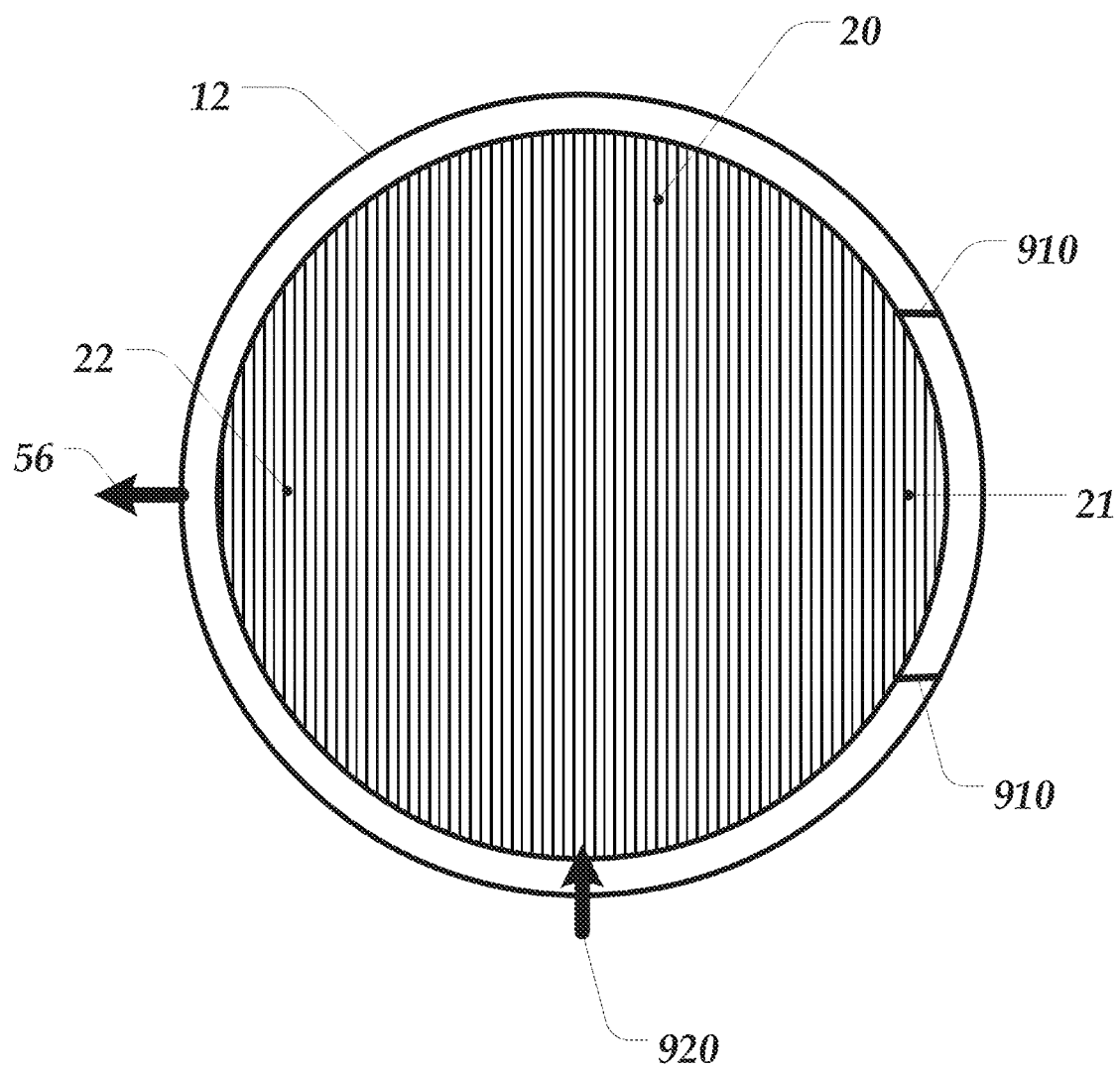
FIG. 9 illustrates an example attachment scheme for attaching a septum to the inside of a vessel.

FIG. 9 illustrates an example attachment scheme for attaching a septum 20 to the inside of a vessel. In general, one or more attachment device 910 is used to attach septum 20 to the inside of vessel 12. Side 21 of septum 20 indicates its attachment side. Side 22 of septum 20 indicates its free side. In one example, the center region of the point(s) of attachment on attachment side 21 of septum 20 to the inside of vessel 12 is typically substantially opposite effluent outlet 56.

Attachment device(s) 910 may be fabricated from wire, chain, plastic, or any other material that meets the following requirements. Attachment device(s) 910 are sufficiently flexible to allow septum 20 to move and pitch within or upon wastewater 14 in any turbulence or the like such that the movement of free side 22 may allow any clogging waste floating under septum 20 to exit effluent outlet 56. Further, attachment device(s) 910 are sufficient in number, location, and design so as to prevent septum 20 from flipping over or otherwise failing in its purpose to prevent or minimize rising bacteria from exiting the vessel 12. Further, attachment device(s) 910 are also sufficiently robust so as to provide long-term mechanical reliability without breakage or failure of the device(s) 910. For example, attachment device(s) 910 may be fabricated from stainless steel chain or the like and permanently or irremovably attached to vessel 12 and septum 20 via any suitable means.

FIG. 9 also illustrates an example optional jet 920 such as a water jet oriented so as to flush any clogging waste from septum 20. Typically, such water jets are optionally oriented around the inside wall and/or at various locations at the top of vessel 12 with their high-pressure outlet nozzles aimed at various portions (e.g., top and/or bottom) of septum 20 or any number of septums within vessel 12 so as to spray across and/or into and/or through the vanes of the septum(s). The jets may be controlled separately and/or in groups and/or all together so as to flush any clogging waste from septum 20, thus cleaning septum 20 of any built-up clogging waste or any other debris or the like. Various such jets may be mounted inside vessel 12 and/or pass through the outer surface of vessel 12. In one example, such jets are connected to an inlet pipe(s) that provides water or the like to the inlet side of the jets. In another example, one or more such jets is aimed at a site glass mounted in the side of vessel 12 so as to clear the glass of any visual obstructions or the like. The water or the like fed to the jet inlets may be potable water from an external source and/or may be liquid taken from inside vessel 12, and is typically cleaned (e.g., filtered or the like) sufficiently so as to not clog the jets. In addition to flushing clogging waste or the like from a septum(s), the jet(s) may also be oriented so as to move such waste toward effluent outlet 56.

Figure 10:
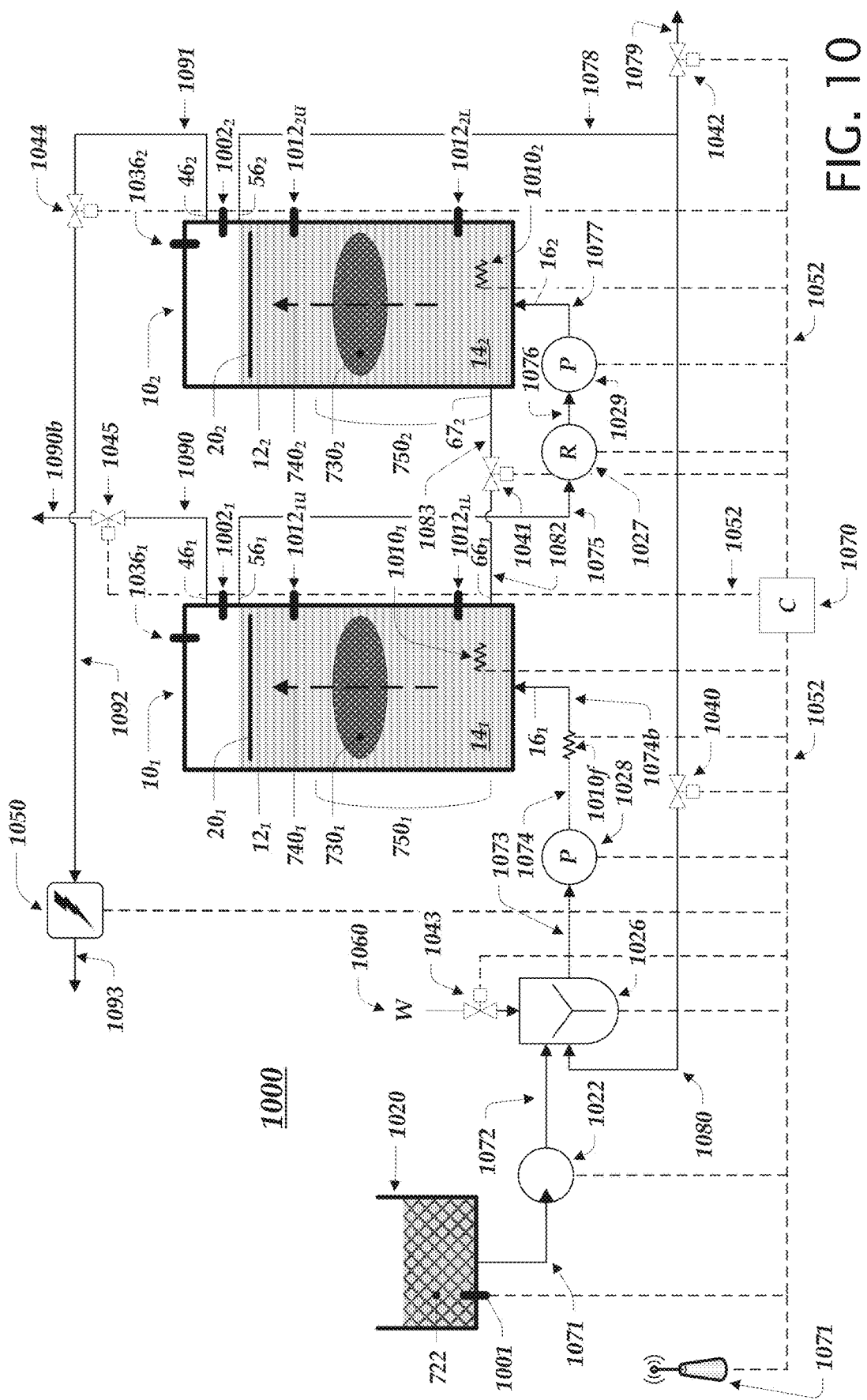
FIG. 10 is a schematic diagram that illustrates an example of induced sludge bed anaerobic bioreactor system 1000 with, inter alia, two-stages of reactor-based processing.

FIG. 10 is a schematic diagram that illustrates an example of induced sludge bed anaerobic bioreactor system 1000 with, inter al/a, two-stages of reactor-based processing. The terms "reactor," "bioreactor," and "anaerobic bioreactor" as used here refer to the same things unless otherwise indicated. The first stage of reactor processing 1200 is typically performed by anaerobic bioreactor $10_1$ and the second stage of reactor processing 1400 is typically performed by anaerobic bioreactor $10_2$. In addition to these two stages of reactor processing, system 1000 also includes several other subsystems: first-stage feeding system 1100, second-stage feeding system 1300, pH balancing system 1500, effluent recirculation system 1600, gas management system 1700, and controller 1070, each subsystem comprising one or more of the components illustrated in FIG. 10.

The term "conduit" as used herein refers to any suitable pipe, tube, hose, channel, or other passageway through which solids, liquids, gasses, and/or mixtures of the foregoing ("materials") may be drawn, pumped, or otherwise moved. Different conduits in system 1000 may be used to move various materials, such as, for example, substrates, solids, water in its various forms, other liquids, effluents, gases, combinations of the foregoing, and the like. Such materials may have various characteristics such as temperature, acidity, corrosiveness, abrasiveness, viscosity, and the like and/or may be under some amount of pressure or vacuum. Such characteristics may vary over time. Further, system 1000, or portions thereof including its conduits, may be subject to various environmental conditions including vibrations, temperature and/or pressure variations and extremes, acidic and/or alkaline substances and/or conditions, and the like. As such, each of the conduits in system 1000 may include various combinations of properties, characteristics, or capabilities sufficient to perform its intended function under the environmental conditions and subject to the characteristics of the materials that move through it.

The term "control valve" as used herein refers to a valve used to control the flow of one or more kinds of materials, as defined above, by opening or closing a flow passage as directed by a signal from a controller, such as controller 1070. In other examples, a more advanced control valve controls material flow by varying the size of the flow passage in order to realize a particular rate of flow through the valve. In other examples, a control valve may include an integrated pumping mechanism, or operate in conjunction with a separate pumping mechanism, to insure the controller-specified flow or flow rate through the valve.

The terms "heater" and "heating device" as used herein refer to any kind of heating mechanism, including those that operate on gas, electricity, solar, or otherwise, that can bring one or more kinds of materials, as defined above, up to a temperature as directed by a controller, such as controller 1070. The terms "reducer" and "cooling device" as used herein refer to any kind of cooling mechanism, including a heat exchanger, radiator, cooling device, or other mechanism, that can bring one or more kinds of materials, as defined above, down to a temperature as directed by a controller, such as controller 1070. Further, such a heater may include an integrated reducer, or operate in conjunction with a separate reducer, so as to bring the temperature of materials up or down as directed by a controller. Further, such a reducer may include an integrated heater, or operate in conjunction with a separate heater, so as to bring the temperature of materials up or down as required by a controller.

First-stage feeding system 1100. In general, under the control of controller 1070, this system performs the function of preparing substrate and feeding it into the first stage of reactor processing 1200. Substrate preparation typically includes receiving raw substrate in container 1020, optionally macerating the raw substrate, mixing the macerated substrate with water or effluent, and optionally adjusting the temperature of the mixed substrate to be substantially the same as the first-stage processing temperature. The prepared substrate is then pumped or otherwise fed into first-stage reactor $10_1$ for processing.

Figure 11:
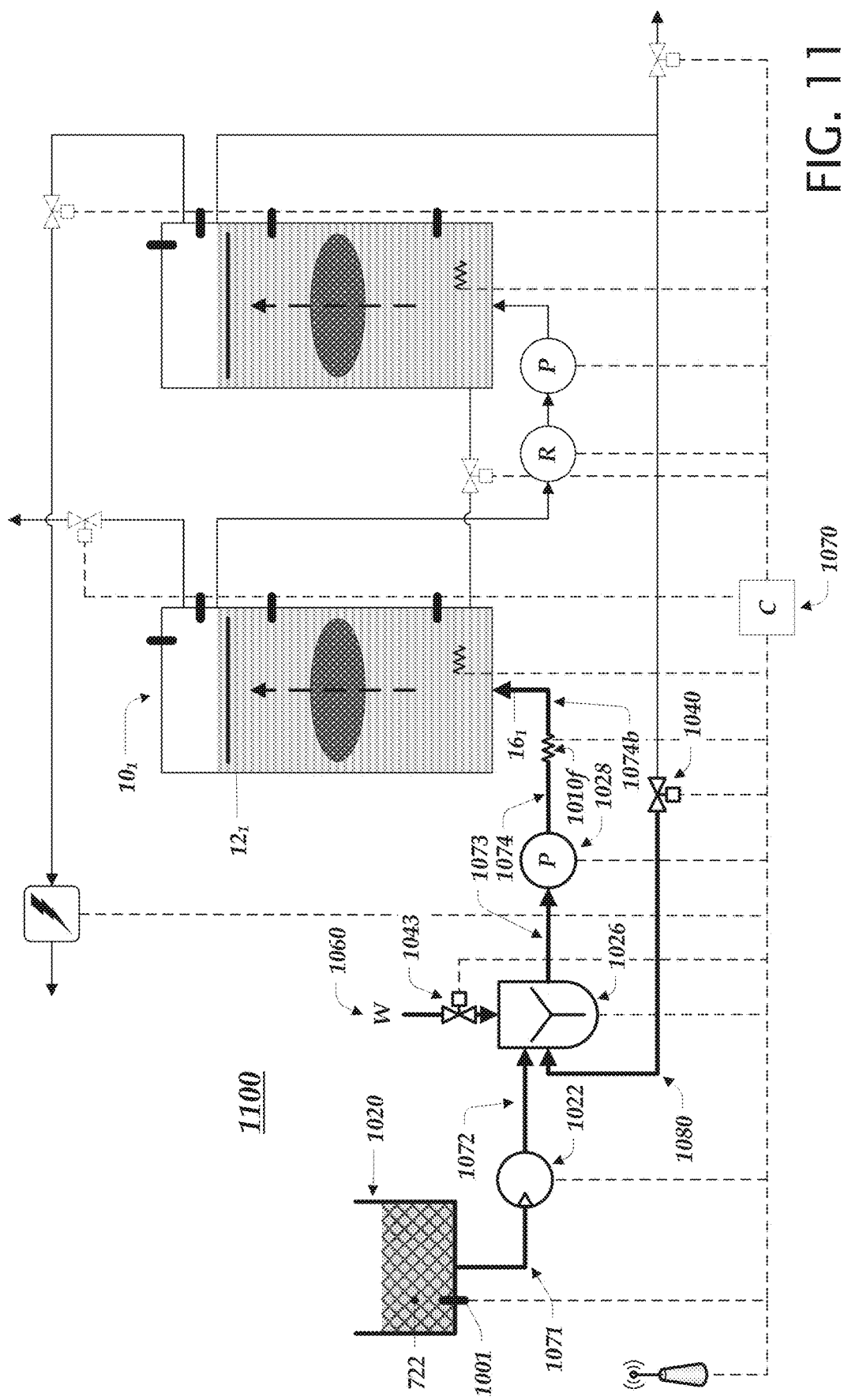
FIG. 11 is a schematic diagram that highlights components of the first-stage feeder system 1100 illustrated in FIG. 10.

FIG. 11 is a schematic diagram that highlights components of the first-stage feeder system 1100 illustrated in FIG. 10. In some examples, this system comprises substrate container 1020 that is configured to hold raw substrate 722, sensor 1001, conduit 1071, macerator 1022, conduit 1072, mixer 1026, control valve 1043, conduit 1080, control valve 1040, conduit 1073, pump 1028, conduit 1074, heater 1010f, and conduit 1074b. The phrase "raw substrate" as used herein refers to substrate as it is provided to system 1000 when placed or collected in container 1020 where the substrate has not yet been processed by system 1000. In brief, first-stage feeder system 1100 is typically configured to optionally macerate raw substrate, to mix substrate, including the macerated substrate, with water and/or second-stage effluent resulting in a substrate mixture, to optionally bring the temperature of the substrate mixture to be substantially the same as that of the wastewater used in the first-stage of reactor processing, and to pump or feed substrate mixture into the first-stage of reactor processing. The term "mixer" as used herein, such as for mixer 1026, typically refers to an apparatus that is distinct from and different than a "vessel" as that term is used herein, such as reactor vessels 12 and pre-processing vessels such as vessel $12_p$ (illustrated in FIG. 21).

In some examples, first-stage feeding system 1100 includes at least one substrate container 1020 which may be any combination of one or more tanks, hoppers, vessels, reservoirs, or the like (typically depending on the substrate or substrates that system 1000 is designed to process) that receive and hold one or more similar or different substrates from outside of system 1000. Each container 1020 includes one or more sensors 1001 of different or similar types that enable controller 1070 to detect the presence, level, amount, weight, mass, and/or type of substrate 722, and/or various characteristics thereof.

In some examples, raw substrate 722 is fed or drawn intermittently or continuously from container 1020 through conduit 1071 into macerator 1022, which performs essentially the same function as macerator 710 described above. Macerator 1022 is typically operated by controller 1070. In some embodiments, macerator 1022 may perform a pumping function as well, typically under the control of controller 1070. In brief, macerator 1022 is configured to limit a maximum rigid dimension of the substrate, and any clogging waste it comprises, to a particular maximum size that is less than a size capable of clogging first-stage anaerobic bioreactor 1200 and/or second-stage anaerobic bioreactor 1400.

In some examples, depending on the substrate (e.g., primarily solids such as grass, leaves, wood chips, waste food and organic matter, manure, etc.), container 1020 may include some form of pump or the like, such as an auger or screw pump, that draws raw substrate 722 from container 1020 and feeds it through conduit 1071 into macerator 1022. In another example, macerator 1022 may draw substrate 722 from container 1020. In some examples, the specific mechanism(s) responsible for moving the substrate from container 1020, be it some form of pump and/or macerator 1022 or the like, is/are controlled by controller 1070.

In some examples, macerated substrate moves intermittently or continuously through conduit 1072 into mixer 1026 where a substrate mixture is produced; the macerated substrate is typically mixed with water W from external source 1060 and/or recycled second-stage effluent from conduit 1080. In some examples, the rate at which the raw substrate 722 flows from container(s) 1020 is also controlled by controller 1070 so as to enable the first average flow rate $Q_1$ of macerated substrate between macerator 1022 and mixer 1026.

In some examples, mixer 1026 is configured for producing a substrate mixture by mixing the macerated substrate with water W from source 1060, which is external to system 1000, and/or with recycled second-stage effluent from conduit 1080. In this example, water flow into mixer 1026 is controlled by controller 1070 via control valve 1043, and effluent flow into mixer 1026 is controlled by controller 1070 via control valve 1040. In brief, mixer 1026 is configured to mix at least the substrate with either the water or the second-stage effluent resulting in the substrate mixture.

In some examples, the substrate mixture moves intermittently or continuously at a second average flow rate $Q_2$ through conduits 1073, 1074, and 1074b, and through optional heater 1010f, or through some other suitable configuration, into the first stage of reactor processing 1200; for example, into reactor $10_1$ via substrate inlet $16_1$. Further, operating under the control of controller 1070, pump 1028 operates under the control of controller 1070 to induce a second average flow rate $Q_2$ of the mixed substrate into the first stage of reactor processing 1200.

In some examples, heater or heating device 1010f and conduit 1074b are optional. In other examples, heater 1010f may additionally or alternatively comprise a temperature reducer or cooling device that may also be under control of controller 1070. As such, heater 1010f typically operates to raise or reduce the temperature of the mixed substrate to be substantially similar to that at which the first stage of reactor processing 1200 occurs in reactor $10_1$. In some examples, the mixed substrate is brought to a temperate of within 4 degrees Celsius of the first stage processing temperature $T_{S1}$. In brief, the heating device and/or cooling device is configured to bring, prior to feeding the substrate mixture into first-stage reactor processing system 1200, the temperature of the substrate mixture to substantially the temperature of the wastewater used in first-stage of reactor processing 1200.

Other configurations also fall within the scope and spirit of first-stage feeding system 1100. For example, maceration may be performed external to system 1000 so as to eliminate the need for macerator 1022 in system 1000. In other examples, each of one or more containers 1020 may be coupled to its own macerator from which the corresponding macerated substrates are moved into mixer 1026. Further, other configurations also fall within the scope and spirit of the invention.

Further, first-stage feeding system 1100 and/or one or more of its components may be packaged along with or largely separate from the remainder of system 1000 or any of its other subsystems. The term "packaged" as used herein refers to being mounted on a platform or the like or contained in a container or the like, where such platforms and containers are not permanent additions to or betterments of real property that enhance its capital value. For example, first-stage feeding system 1100 may be contained in one container while first-stage reactor processing system 1200 may be contained in a separate container. Thus, in order to operate together, the two separate systems in their respective containers may be brought within proximity to one another and coupled together via conduits, wires, etc., as required for operation.

First-stage reactor processing system 1200. In general, under the control of controller 1070, this system performs the function of digesting the substrate fed into the system 1200 resulting in the production of first-stage effluent and biogas. In general, the first-stage reactor system 1200 is configured and largely operates as described with respect to reactor 10 above, with at least the following additions and/or changes.

Figure 12:
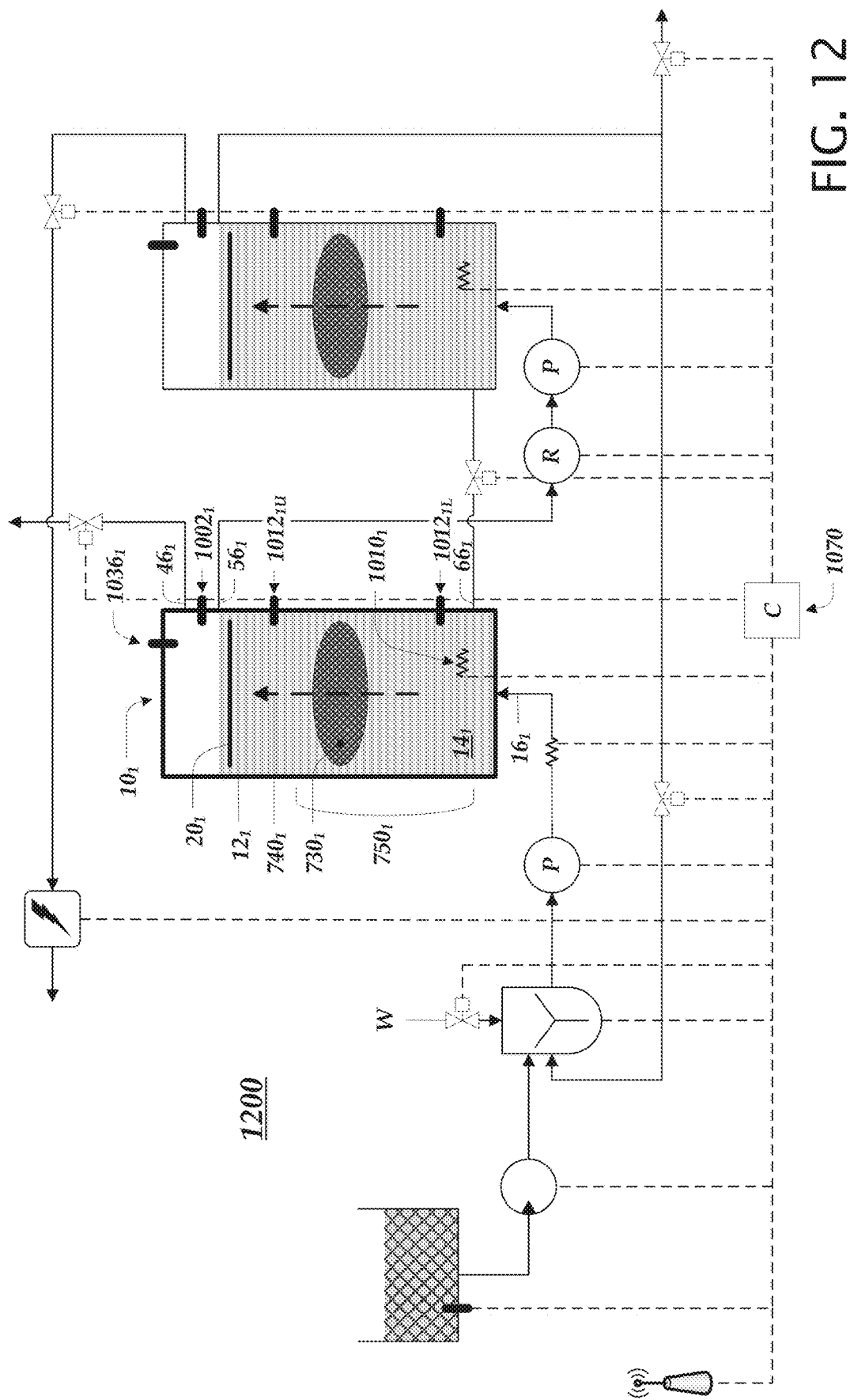
FIG. 12 is a schematic diagram that highlights components of the first-stage reactor processing system 1200 illustrated in FIG. 10.

FIG. 12 is a schematic diagram that highlights components of the first-stage reactor processing system 1200 illustrated in FIG. 10. In some examples, this system comprises reactor 10$_1$, inlet 66$_1$, heater 1010$_1$, pH sensors 1012$_{1L}$ (where 'L' means "lower") and 1012$_{1U}$ (where 'U' means "upper"), pressure sensor 1002$_1$, and loading port 1036$_1$. In brief, first-stage reactor processing system 1200 is typically configured to process a substrate mixture via anaerobic digestion resulting in first-stage effluent. Further, first-stage reactor processing system 1200 is typically configured for processing the substrate mixture in wastewater 14$_1$ that is maintained by controller 1070 at a temperature of between 25 and 65 degrees Celsius.

In some examples, reactor 10$_1$ includes one or more heaters 1010$_1$ of different or similar types positioned within or without vessel 12$_1$ in any suitable location(s) and configuration(s) so as to enable controller 1070 to detect and control the temperature of wastewater 14$_1$ as it is being processed by reactor 10$_1$. In one embodiment, controller 1070 maintains temperature $T_{S1}$ between 70 and 80 degrees Celsius. In this embodiment, substrate fed into the first-stage reactor system 1200 largely comprises organic green waste or other such fibrous wastes, food wastes, or manures.

In some examples, reactor 10$_1$ includes the components and performs the functions of reactor 10 as described above. In the same or other examples, reactor 10$_1$ further includes one or more upper and lower pH sensors 1012$_{1U}$ and 1012$_{1L}$ respectively. Both sensors are mounted in vessel 12$_1$ so as to be able to detect the pH of wastewater 14$_1$ and to be coupled to controller 1070. In one embodiment, upper sensor 1012$_{1U}$ is positioned so as to detect the pH of wastewater 14$_1$ above sludge bed 730$_1$ at the "upper-midpoint," which is substantially half-way between septum 20$_1$ and the anticipated location of the upper portion of sludge bed 730$_1$ during operation of reactor 10$_1$. In this embodiment, lower sensor 1012$_{1L}$ is positioned so as to detect the pH of wastewater 14$_1$ below sludge bed 730$_1$ at the "lower-midpoint," which is substantially half-way between substrate inlet 16$_1$ and the anticipated location of the lower portion of sludge bed 730$_1$ during operation of reactor 10$_1$. In brief, upper pH sensor 1012$_{1U}$ is typically configured to detect the pH of wastewater 14$_1$ above sludge bed 730$_1$ in reactor 10$_1$; and lower pH sensor 1012$_{1L}$ is typically configured to detect the pH of wastewater 14$_1$ below the sludge bed 730$_1$ in reactor 10$_1$.

In some examples, reactor 10$_1$ includes an inlet 66$_1$ in vessel 12$_1$ that is located between the lower-midpoint and substrate inlet 16$_1$. This inlet is typically used by pH balancing system 1500. In other examples, inlet 66$_1$ is located at other locations in vessel 12$_1$.

In some examples, reactor 10$_1$ includes a pressure sensor 1036$_1$ that is located at or near the top of vessel 12$_1$, above wastewater 14$_1$. This sensor is mounted in vessel 12$_1$ so as to enable controller 1070 to monitor the pressure inside vessel 12, above wastewater 14$_1$.

In some examples, reactor 10$_1$ includes a loading port 1036$_1$ that is located in or near the top of vessel 12$_1$, above wastewater 14$_1$. This port is typically used to load starter bacteria into reactor 10$_1$. The term "starter bacteria" as used herein refers to select strains of bacteria and/or other microorganisms helpful to improving the efficacy, efficiency or stability of a bioreactor. In some examples, this port includes a lid that, when properly closed, seals the port. The port may include a sensor that enables controller 1070 to detect whether or not the lid is properly closed and/or sealed.

Further, first-stage reactor processing system 1200 may be packaged along with or largely separate from the remainder of system 1000 or any of its other subcomponents.

Second-stage feeding system 1300. In general, under the control of controller 1070, this system performs the function of preparing the effluent from stage-one reactor processing 1200 and feeding it as substrate into the second stage of reactor processing 1400. Effluent preparation may optionally include adjusting the temperature of the first-stage effluent to be substantially the same as the second-stage processing temperature. The prepared substrate is then pumped or otherwise moved into second-stage reactor 10$_2$.

Figure 13:
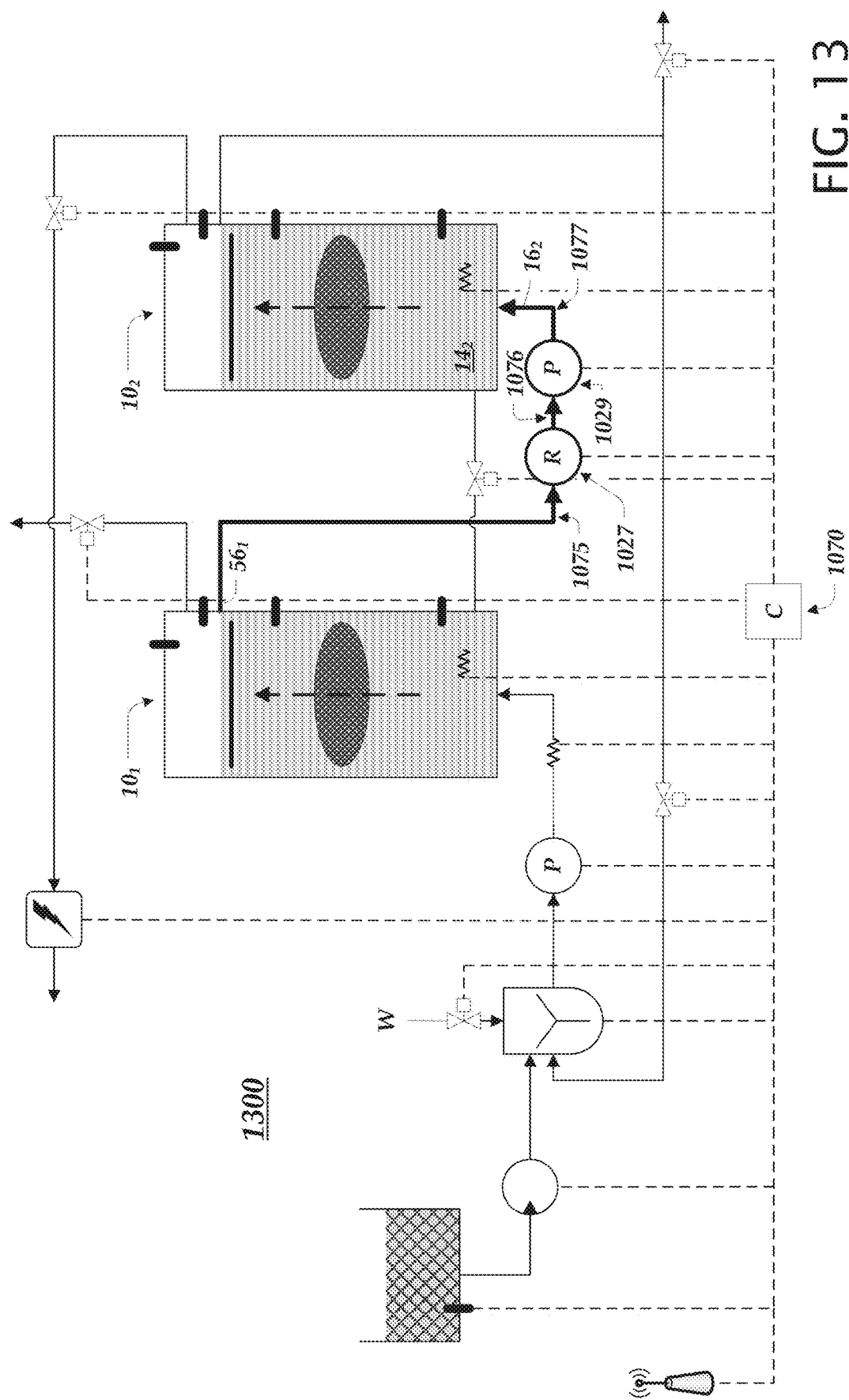
FIG. 13 is a schematic diagram that highlights components of the second-stage feeding system 1300 illustrated in FIG. 10.

FIG. 13 is a schematic diagram that highlights components of second-stage feeding system 1300 illustrated in FIG. 10. In some examples, this system comprises conduit 1075, reducer 1027, conduit 1076, pump 1029, and conduit 1077. Conduit 1075 typically couples effluent outlet 56$_1$ to reducer 1027, which typically operates under the control of controller 1070 and is optional in some embodiments. Otherwise, reducer 1027 may additionally or alternatively comprise a heater that may also operate under the control of controller 1070. As such, reducer 2027 may operate to reduce or raise as necessary the temperature of the effluent coming from reactor 10$_1$ to be substantially similar to that at which the second stage of reactor processing 1400 occurs in reactor 10$_2$. In some examples, the effluent is brought to a temperature of within 4 degrees Celsius of the second stage processing temperature $T_{S2}$.

In some examples, conduit 1076 couples the output of reducer 1027 to the inlet of pump 1029. In embodiments without reducer 1027, conduit 1075 typically couples effluent outlet 56$_1$ to pump 1029, which operates under the control of controller 1070 to induce a third average flow rate $Q_3$ sufficient to move, intermittently or continuously, the first-stage effluent from reactor 10$_1$ into the second stage of reactor processing 1400; for example, into reactor 10$_2$ via substrate inlet 16$_2$.

Other configurations also fall within the scope and spirit of second-stage feeding system 1300. For example, pump 1029 may not be required due to, inter alia, the relative sizes of vessels 12$_1$ and 12$_2$ and/or the relative volumes of wastewater 14$_1$ and 14$_2$. In other examples, pump 1029 may be located before or after reducer 1027, or integrated within reducer 1027, if a reducer used. In other examples, neither reducer 1027 nor pump 1029 is required and effluent outlet 56$_1$ is coupled directly, or via a flow controller, to substrate inlet 16$_2$. In other examples, reducer 1027 or pump 1029, either optional, may be or include a flow controller. Such a flow control device may not include pumping functionality or heating or cooling functionality, but flow control functionality instead.

Further, second-stage feeding system 1300 may be packaged along with or separately from system 1000 or its other subsystems. In one example, system 1300 may be packaged in full or in part with subsystems 1100, 1200, and/or 1400.

Second-stage reactor processing system. In general, under the control of controller 1070, this system performs the function of digesting the first-stage effluent (the processed substrate) fed into the system resulting in the production of biogas and second-stage effluent that is different than the first-stage effluent. In general, the second-stage reactor system 1400 is configured and operates as described above with respect to reactor 10 above, with at least the following additions and/or changes.

Figure 14:
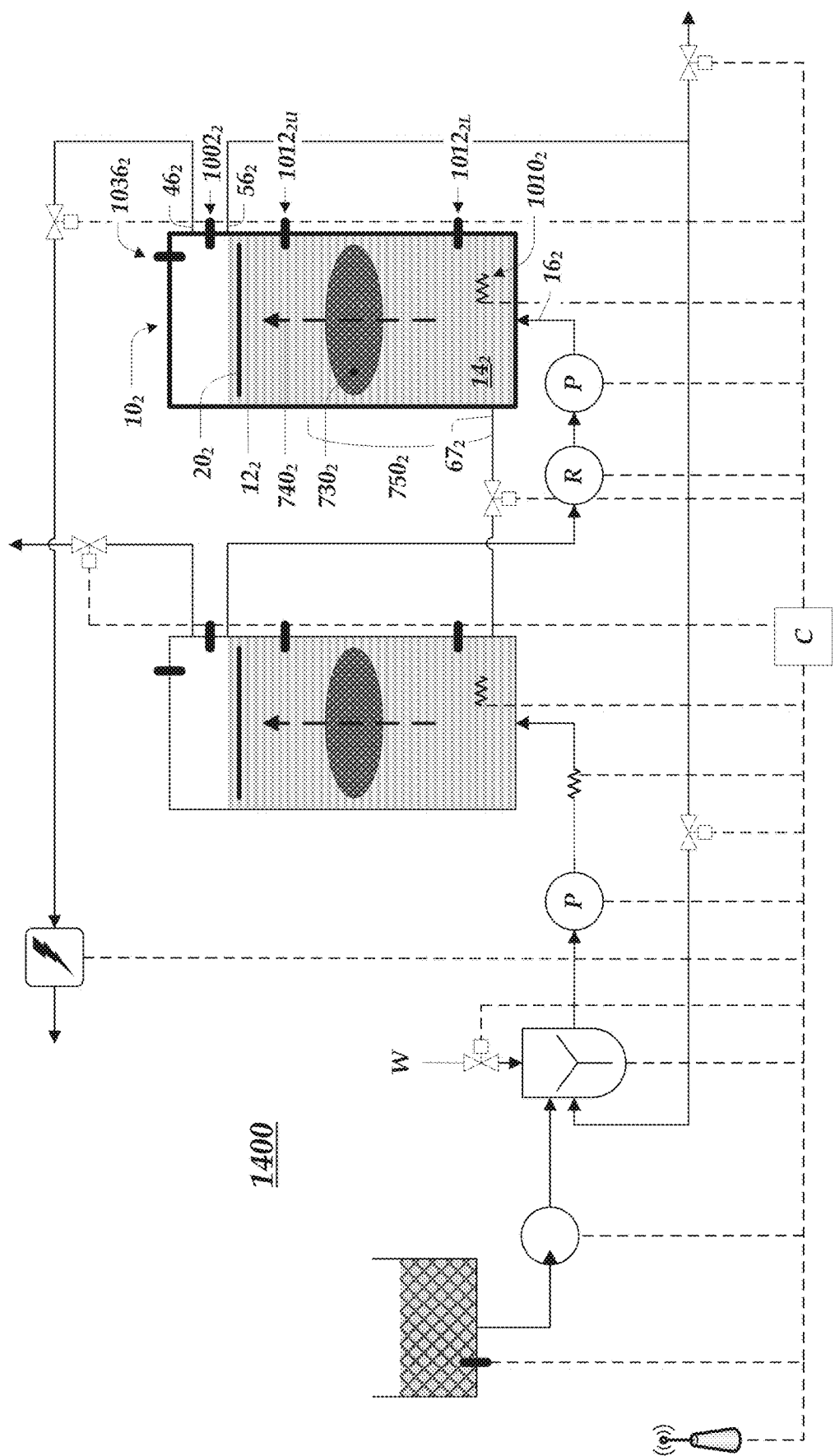
FIG. 14 is a schematic diagram that highlights components of the second-stage reactor processing system 1400 illustrated in FIG. 10.

FIG. 14 is a schematic diagram that highlights components of the second-stage reactor processing system 1400 illustrated in FIG. 10. In some examples, this system comprises reactor $10_2$, heater $1010_2$, pH ("potential of hydrogen") sensors $1012_{2L}$ (where 'L' means "lower") and $1012_{2U}$ (where 'U' means "upper"), and loading port $1036_2$. In general, the second-stage reactor system is configured and operates as described above with respect to reactor 10, with the following additions. In brief, second-stage reactor processing system 1400 is typically configured to process the first-stage effluent via anaerobic digestion resulting in second-stage effluent that is different than the first-stage effluent. Further, second-stage reactor processing system 1400 is typically configured for processing the substrate mixture in wastewater $14_2$ that is maintained by controller 1070 at a temperature of between 70 and 80 degrees Celsius.

In some examples, reactor $10_2$ includes one or more heaters $1010_2$ of different or similar types positioned within or without vessel $12_2$ in any suitable location(s) and configuration(s) so as to enable controller 1070 to detect and control the temperature of wastewater $14_2$ as it is being processed by reactor $10_2$. In one embodiment, controller 1070 maintains temperature $T_{S2}$ between 25 and 65 degrees Celsius, or alternatively between 55 and 60 degrees Celsius. In this embodiment, the substrate fed into the second-stage reactor system comprises largely of the processed first-stage effluent from reactor $10_1$.

In some examples, reactor $10_2$ includes the components and performs the functions of reactor 10 as described above. In the same or other examples, reactor $10_2$ also includes one or more upper and lower pH sensors $1012_{2U}$ and $1012_{2L}$ respectively. Both sensors are mounted in vessel $12_2$ so as to be able to detect the pH of wastewater $14_2$ and to be coupled to controller 1070. In one embodiment, upper sensor $1012_{2U}$ is positioned so as to detect the pH of wastewater $14_2$ above sludge bed $730_2$ at the "upper-midpoint," which is substantially half-way between septum $20_2$ and the anticipated location of the upper portion of sludge bed $730_2$ during operation of reactor $10_2$. In this embodiment, lower sensor $1012_{2L}$ is positioned so as to detect the pH of wastewater $14_2$ below sludge bed $730_2$ at the "lower-midpoint," which is substantially half-way between substrate inlet $16_2$ and the anticipated location of the lower portion of sludge bed $730_2$ during operation reactor $10_2$. In brief, upper pH sensor $1012_{2U}$ is typically configured to detect the pH of wastewater above the sludge bed in reactor $10_2$; and the lower pH sensor $1012_{2L}$ is typically configured to detect the pH of wastewater below the sludge bed in reactor $10_2$.

In some examples, reactor $10_2$ includes an outlet $67_2$ in vessel $12_2$ that is located between the lower-midpoint and substrate inlet $16_2$. This outlet is typically used by pH balancing system 1500.

In some examples, reactor $10_2$ includes a pressure sensor $1036_2$ that is located at or near the top of vessel $12_2$ above wastewater $14_2$. This sensor is mounted in vessel $12_2$ so as to enable controller 1070 to monitor the pressure above wastewater $14_2$ inside vessel $12_2$.

In some examples, reactor $10_2$ includes a loading port $1036_2$ that is located in or near the top of vessel $12_2$ and above wastewater $14_2$. This port is typically used to load starter bacteria into reactor $10_2$. In some examples, this port includes a lid that, when properly closed, seals the port. The port may include a sensor that enables controller 1070 to detect whether or not the lid is properly closed.

Further, second-stage reactor processing system 1400 may be packaged along with or largely separate from the remainder of system 1000 or any of its other subcomponents.

Other configurations also fall within the scope and spirit of second-stage reactor processing system 1400 and first-stage reactor processing system 1200. For example, in some embodiments, the first stage of reactor processing may be performed by a plurality of reactors such as reactor $10_1$ that are configured to operate in parallel with each other. In other embodiments, the second stage of reactor processing may be performed by a plurality of reactors such as reactor $10_2$ that are configured to operate in parallel. The phrase "operate in parallel" as used herein means that processed substrate is fed into each first-stage parallel reactor's substrate inlet 16, although the inlets are not necessary directly connected to each other, and that for a given stage the processed effluent from each reactor's effluent outlet 56 is fed to the next stage, although these outlets are not necessary directly connected to each other, where in a two-stage example the next stage is the second stage if the effluent is coming from first stage of reactor processing system 1200, or the next stage is effluent recirculation system 1600 if the effluent is coming from second stage of reactor processing system 1400.

Further, systems with more than two stages of reactor processing are also within the scope and spirit of the invention. For example, a multi-stage processing system may include any number of stages of reactor processing, each operating under the control of controller 1070 and/or under the control of its own controller, where the effluent from each stage is, with optional processing, fed into the next reactor processing stage, and where the final-stage effluent is recirculated by effluent recirculation system 1600 to one or more prior stages. Each stage in such a system may process its substrate at any temperature required for the substrate being processed. The gases resulting from each stage may be managed as required by the characteristics of each gas. Further, any stage in a multi-stage processing system may include one, two, or more reactors operating in parallel as described above. In some examples, the number of parallel reactors at a parallel stage may be based at least in part on the digestion rate of the substrate being processed at that stage relative to the digestion rates of substrate at neighboring stages (the stage before and the stage after) of such a system.

Regarding the phrases "first-stage" and "second-stage" as used herein, including in the claims, these phrases do not limit the stages to being stage one and stage two respectively in a two-stage or multi-stage system. Instead, these terms are simply relative to each other and, for example, may refer to a first-stage reactor in a series of stages that simply comes before a second stage in the same series, where the series comprises two or more stages. For example, in a two stage system, a first-stage reactor is a stage one reactor and a second-stage reactor is a stage two reactor because there are only two reactors in the system. But in another example of a five stage system, a first-stage reactor may be the stage three reactor and a second-stage reactor may be the stage four reactor, so long as the second-stage reactor is a stage in the series that comes after the stage-two reactor in the series. In another example, there may be any number of reactor stages between a stage-one reactor and a stage-two reactor. The same applies to feeding systems stages and any other subsystem referred to by stage.

PH balancing system 1500. In general, under the control of controller 1070, this system 1500 performs the function of maintaining a proper range of pH in wastewater $14_1$ below sludge bed $730_1$ in first-stage reactor $10_1$. Additionally or alternatively, similar systems may be utilized for other stages of reactor processing.

Figure 15:
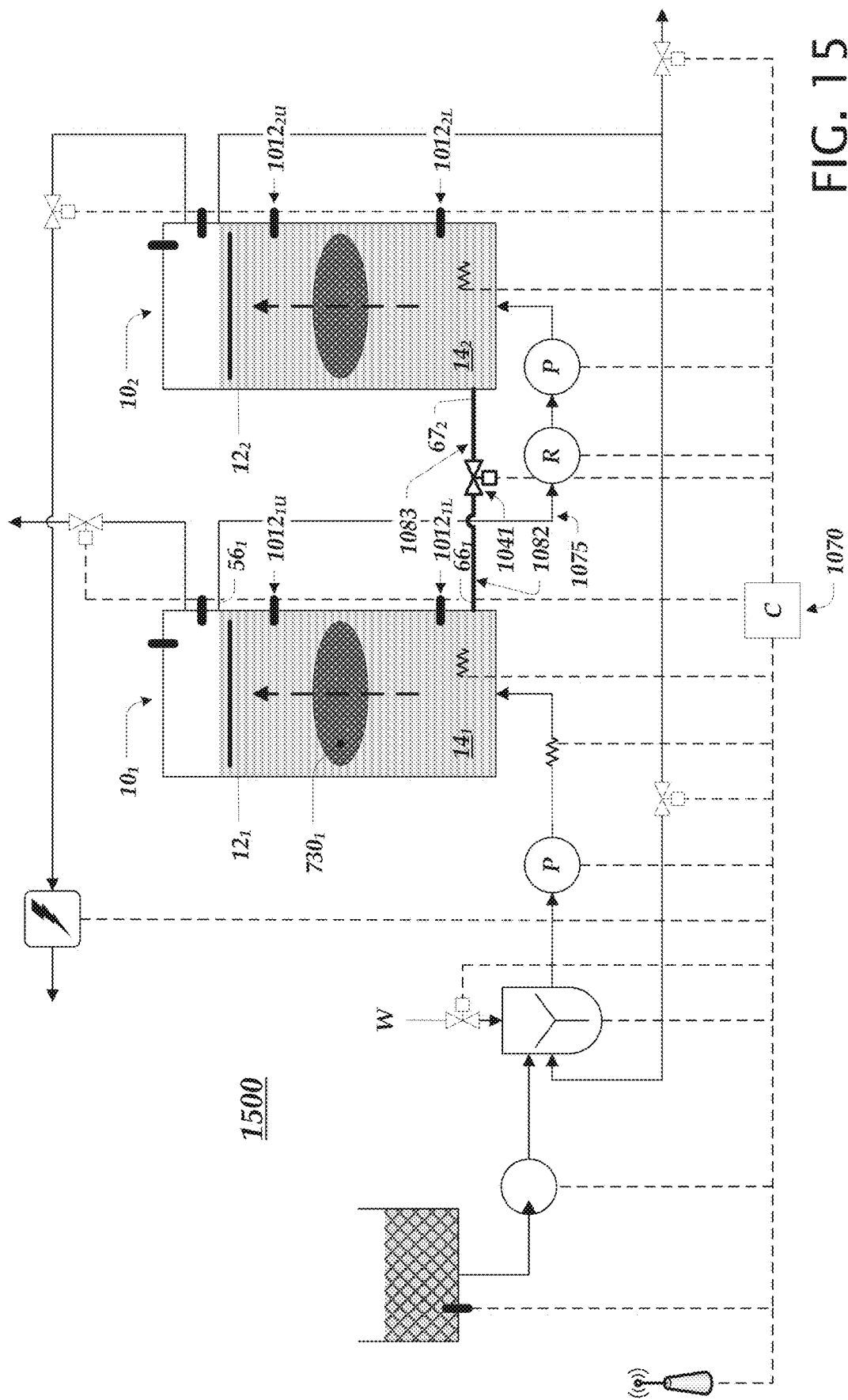
FIG. 15 is a schematic diagram that highlights components of pH balancing system 1500 illustrated in FIG. 10.

FIG. 15 is a schematic diagram that highlights components of pH balancing system 1500 illustrated in FIG. 10. In some examples, pH balancing system 1500 comprises conduit 1083, control valve 1041, conduit 1082, pH sensors 1012$_{1U}$ and 1012$_{1L}$ of reactor 10$_1$, and pH sensors 1012$_{2U}$ and 1012$_{2L}$ of reactor 10$_2$.

Control valve 1041 typically operates under the control of controller 1070. In other examples, control valve 1041 may be or include a pump and/or flow rate control device that operates under the control of controller 1070 so as to enable controller 1070 to pump and/or control the flow or rate of flow of wastewater 14$_2$ from reactor 10$_2$ into reactor 10$_1$. The specific components employed in subsystem 1500 may be based on, inter alia, the relative sizes of vessels 12$_1$ and 12$_2$ and/or the relative volumes of wastewater 14$_1$ and 14$_2$. Note that the effluent from any reactor 10 is typically the same that reactor's wastewater 14 that is located above sludge bed 730. Thus, as used herein, the effluent from a particular reactor is considered the same as the wastewater 14 of that particular reactor that is above sludge bed 730.

In brief, pH balancing system 1500 is configured to detect the pH of wastewater above and below sludge bed 730 in each reactor 10, and to move or vary the flow of, based on the detected pH values, effluent or water into the first-stage reactor 10$_1$ under sludge bed 730$_1$. Additionally or alternatively, pH balancing system 1500 may be configured to reduce, based on the detected pH values, the flow rate of substrate into the first-stage reactor 10$_1$. Further, control valve 1041 is typically configured to enable movement of first-stage effluent or second-stage effluent or water into first-stage reactor 10$_1$ under sludge bed 730$_1$.

Further, other conduit and control valve configurations also fall within the scope and spirit of the invention. In one example, the inlet side of conduit 1083 may alternatively be coupled to effluent outlet 56$_1$ of rector 10$_1$, or conduit 1075, instead of outlet 67$_2$ of reactor 10$_2$. In other examples, system 1000 may include stores of acidic and/or alkaline chemicals or materials that, under the control of controller 0170, may be pumped, moved, or fed into any reactor at any location in the reactor so as to manage the pH at the location.

In some examples, pH balancing system 1500 may also include and/or utilize elements of effluent recirculation system 1600. For example, under the control of controller 1070, second-stage effluent may be fed into reactor 10$_1$ either directly via inlet 66$_1$ or indirectly through first-stage feeding system 1100. In yet another example, water W can be fed from source 1060 into reactor 10$_1$ either directly via inlet 66$_1$ or indirectly through first-stage feeding system 1100.

Other configurations also fall within the scope and spirit of pH balancing system 1500. Further, the various components of pH balancing system 1500 may be packaged with system 1000 as a whole or may be divided up and packaged with other subsystems of system 1000.

Effluent recirculation system 1600. In general, under the control of controller 1070, this system performs the function of recirculating second-stage effluent within and draining excess second-stage effluent from system 1000.

Figure 16:
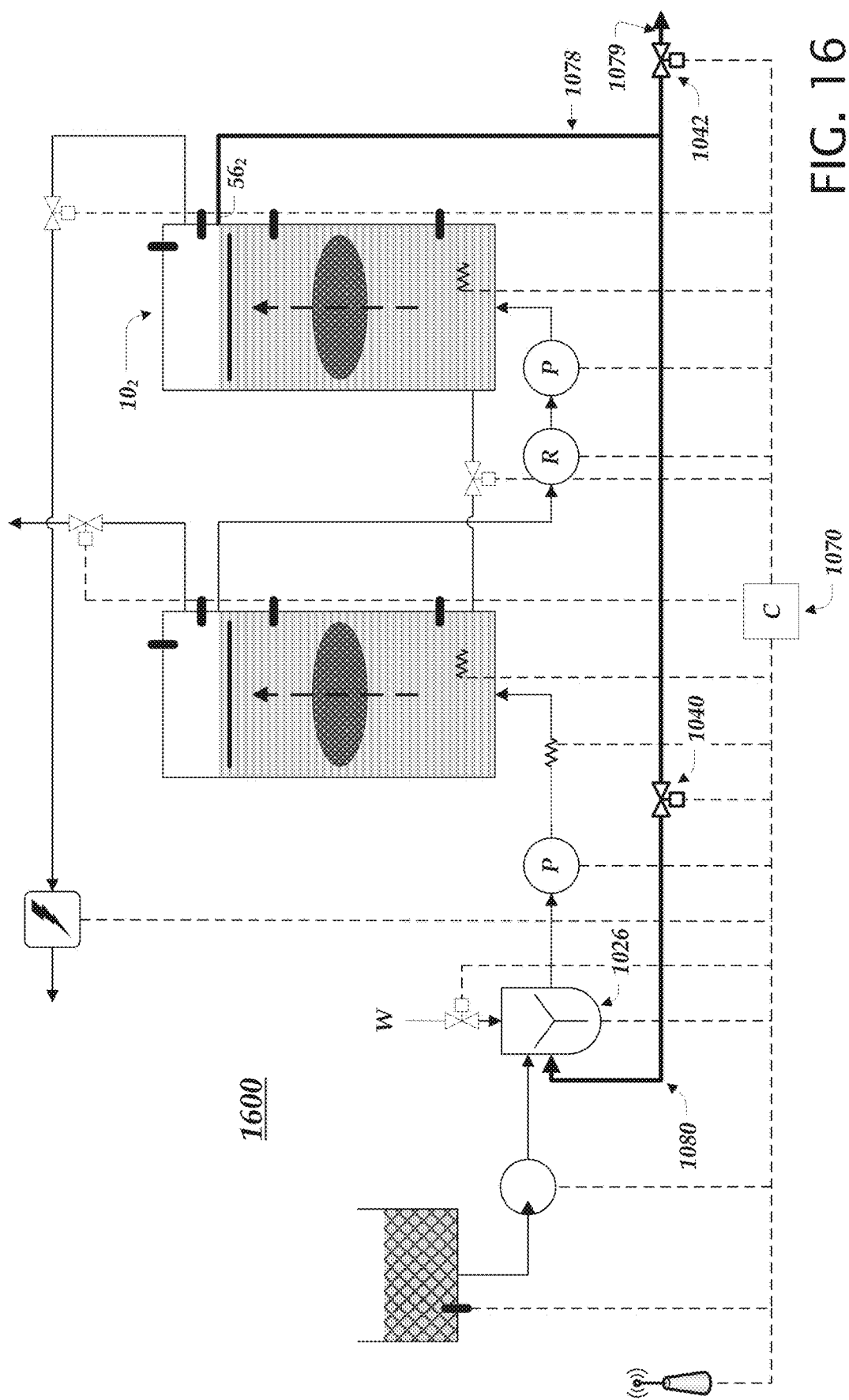
FIG. 16 is a schematic diagram that highlights components of effluent recirculation system 1600 illustrated in FIG. 10.

FIG. 16 is a schematic diagram that highlights components of effluent recirculation system 1600 illustrated in FIG. 10. In some examples, this system comprises conduit 1078, control valve 1042, conduit 1079, control valve 1040, and conduit 1080. Control valve 1040 is typically operated by controller 1070 so as to enable controller 1070 to allow the flow of effluent from reactor 10$_2$ into mixer 1026. In other examples, control valve 1040 may be or include a pumping mechanism and/or flow rate control mechanism that operates under the control of controller 1070 so as to enable controller 1070 to pump, move, or control the flow or rate of flow of effluent from reactor 10$_2$ into mixer 1026. In brief, effluent recirculation system 1600 is configured to recirculate second-stage effluent by mixing at least the second-stage effluent with substrate resulting in a substrate mixture.

Control valve 1042 is typically operated by controller 1070 so as to enable controller 1070 to drain excess effluent from reactor 10$_2$ out of system 1000 via conduit 1079.

Other configurations also fall within the scope and spirit of effluent recirculation system 1600. Further, the various components of effluent recirculation system 1600 may be packaged with system 1000 as a whole or may be divided up and packaged with other subsystems of system 1000.

Gas management system 177. In general, under the control of controller 1070, this system 1700 performs the function of managing the gas produced by system 1000. In some examples, the gas produced may be suitable for use as a biofuel. In other examples, the gas produced by one or more of the reactor stages of system 1000 may be unsuitable for use as a biofuel.

Figure 17:
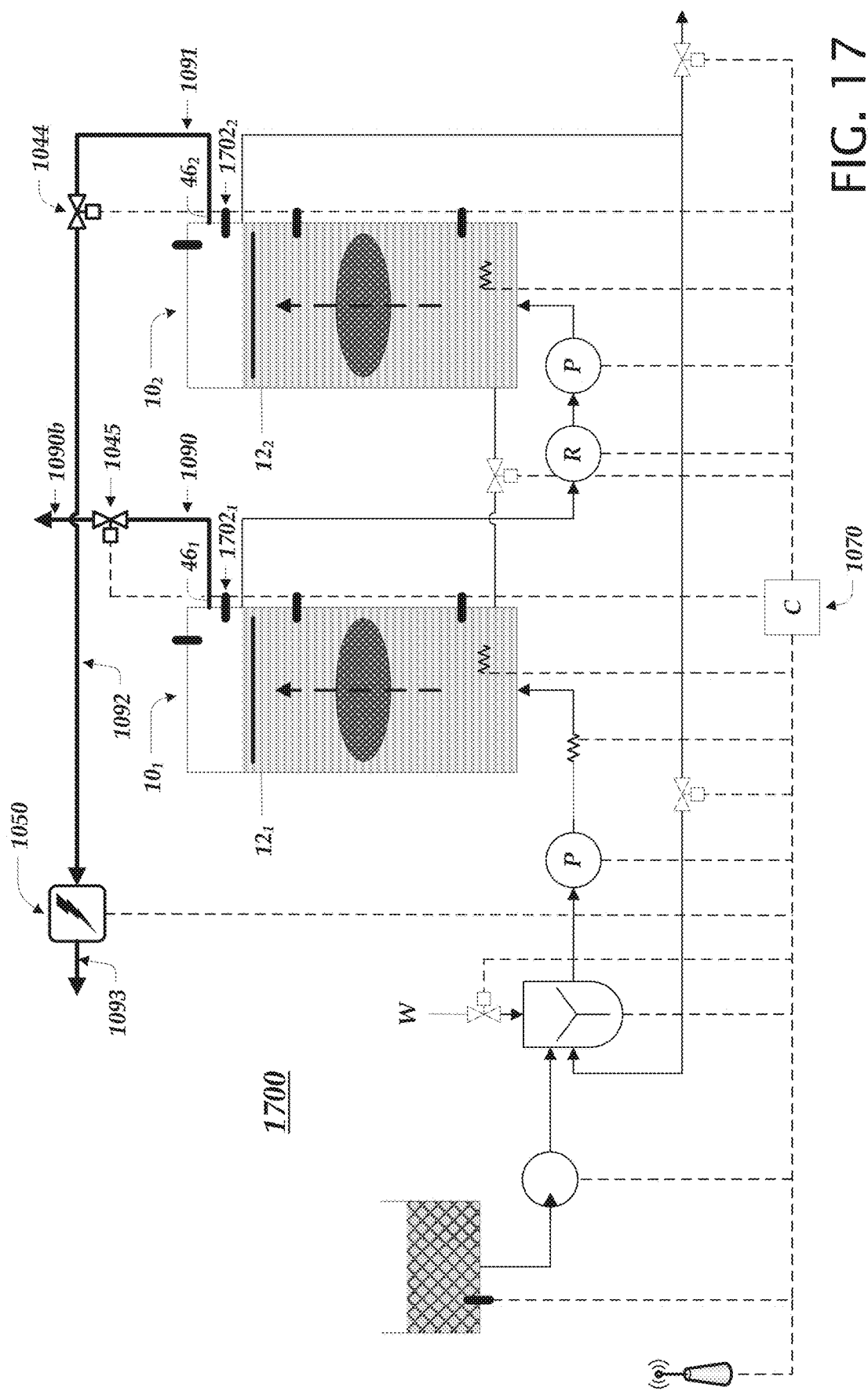
FIG. 17 is a schematic diagram that highlights components of gas management system 1700 illustrated in FIG. 10.

FIG. 17 is a schematic diagram that highlights components of gas management system 1700 illustrated in FIG. 10. In some examples, system 1700 comprises conduit 1090, control valve 1045, conduit 1090$b$, conduit 1091, control valve 1044, conduit 1092, optional biogas generator 1050, and conduit 1093. Control valve 1045 is typically operated by controller 1070 so as to allow controller 1070 to vent the flow of biogas generated by reactor 10$_1$. In one example, venting biogas flows out of gas outlet 46$_1$ via conduit 1090, through control valve 1045, and out of system 1000 via conduit 1090$b$. In another example, if the biogas is suitable, control valve 1045 may vent the biogas to conduit 1092 where it may be consumed by generator 1050.

Control valve 1044 is typically operated by controller 1070 so as to allow controller 1070 to vent the flow of biogas generated by reactor 10$_2$. In one example, venting biogas flows out of gas outlet 46$_2$ via conduit 1091, through control valve 1044, and through conduit 1092 where it can be consumed by generator 1050. In another example, if the biogas is unsuitable, control valve 1045 may vent the biogas out of system 1000. Exhaust from generator 1050 may be vented from system 1000 via conduit 1093.

Other configurations also fall within the scope and spirit of gas management system 1700. In one example, biogas that is suitable may be compressed into storage tanks or conditioned and pumped into the public natural gas utility system or a renewable natural gas ("RNG") facility. In another example, suitable biogas produced by system 1000 may be used as the source of energy for heaters 1010 and the like, thus reducing external energy requirements for system 1000. Further, the various components of gas management system 1700 may be divided up and packaged along with other subsystems of system 1000.

Further, the various components of gas management system 1700 may be packaged with system 1000 as a whole or may be divided up and packaged with other subsystems of system 1000.

Controller. In general, controller 1070 performs the function of controlling, monitoring, and operating system 1000. Such includes providing external communication between controller 1070 and external computing devices and systems via various types of connectivity mechanisms 1071, which may include wired and wireless networks, communication buses such as universal serial bus ("USB") and others, and any other suitable communication mechanisms.

Figure 18:
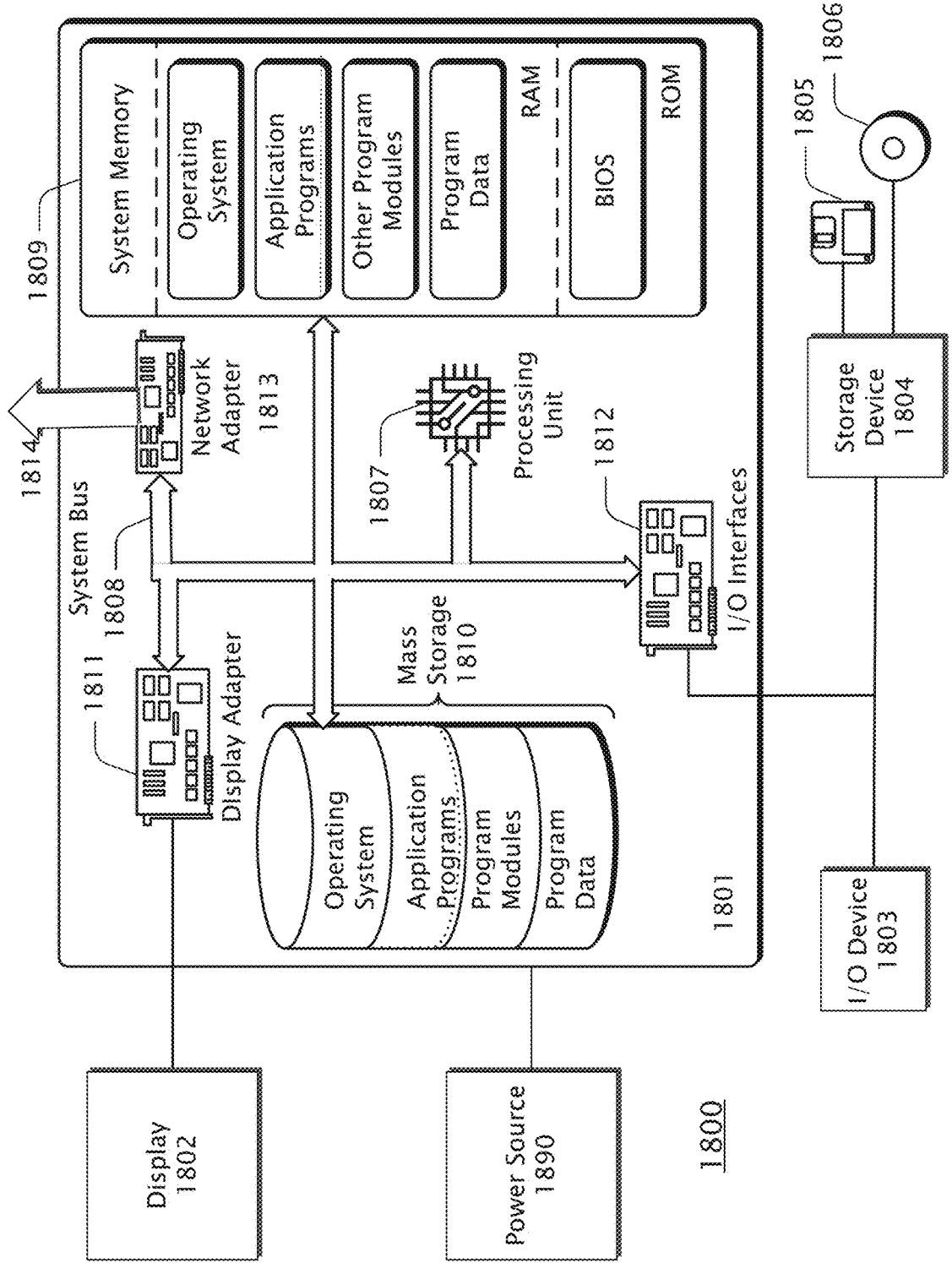
FIG. 18 is a block diagram showing an example computing environment 100 in which controller 1070 may be implemented.

In some examples, such external communication capabilities enable remote computing devices and the like (e.g., as illustrated in FIG. 18) to remotely monitor system 1000 and its subsystems, components, sensors, operating status, etc. The external communication capabilities further enable remote administrators (persons and other entities sufficiently capable), when authorized, to, for example, start system 1000, shut it down, override any automatic control initiated by controller 1070, change its operating mode, etc. In some examples, operating modes include: Shut Down, Starting, Operational, Standby, Shutting Down, System Test, and System Error.

Controller 1070 is typically coupled internally to components of system 1000 that provide sensor data and that can be automatically controlled. Such internal couplings may be digital, analog, wired, wireless, any combination of the foregoing, or any other kind suitable. Such internal couplings are illustrated in the figures by dashed lines 1052, but additional or different internal couplings, other internal coupling configurations, and couplings between packaged subsystems of system 1000 are also within the scope and spirit of the invention. It is via these internal couplings that controller 1070 monitors and receives sensor information and the like, and by which it controls controllable components and the like. Various components may include sensors or the like as well as controllable functionality. For example, a heater component may be controlled by controller 1070 and also provide temperature sensor information back to controller 1070.

In some examples, controller 1070 is coupled to sensors and, according to the various capabilities of the sensors, is configured to detect, measure, and/or monitor the presence, level, amount, weight, volume, mass, or the like of materials (such as, for example, raw substrate in container(s) 1020, wastewater 14 in reactors, etc), and/or various characteristics of the materials (including, but not limited to, temperature, pressure, solids concentration, pH, flow, flow rate, turbulence, acidity, alkalinity, corrosiveness, abrasiveness, viscosity, vibration, and any other characteristics relevant to system 1000), the materials being processed, and the materials resulting from such processing. Via the same or other sensors, controller 1070 may also detect, monitor, read, receive, or the like data or information regarding any of the components of system 1000 where such data or information is made available by sensors separate from the components or by the components themselves. Non-limiting examples of such sensors include those that are part of or associated with system 1000's container(s), macerator(s), mixer(s), control valves, pumps, heaters, reducer(s), communication mechanisms, and any others.

In some examples, controller 1070 is coupled to various components and, according to the various capabilities of the components, is configured to detect, control, and/or monitor the operation and/or characteristics of each, and/or the presence, level, amount, weight, volume, or the like of material contained in, being processed by, or flowing through each, and/or the operation, force, function, flow rate, or other capabilities of each. Detectable characteristics for each such component may include, but are not limited to, its unique identifier, capacities, capabilities, configuration, its available information and the information itself, operating status, power status, component identification and status, and the like. Non-limiting examples of such components include those of system 1000: container(s), macerator(s), mixer(s), control valves, pumps, heaters, reducer(s), communication mechanisms, and any others.

Further, controller 1070 may be packaged along with system 1000 or any of its separately-packaged subsystems or remotely from system 1000 and its subsystems.

FIG. 18 is a block diagram showing an example computing environment 100 in which variations of controller 1070 may be implemented. A suitable computing environment may be implemented with any of numerous general purpose or special purpose devices and/or systems. Examples of such devices/systems include, but are not limited to, computer-based controllers, personal digital assistants ("PDA"), personal computers ("PC"), hand-held or laptop devices, microprocessor-based systems, multiprocessor systems, systems on a chip ("SOC") servers, Internet services, workstations, consumer electronic devices, cell phones, and the like. In all cases, such systems are strictly limited to being articles of manufacture and the like. Different variations of controller 1070 may include different combination of the above and below described devices, systems, and components.

Computing environment 1800 typically includes at least one computing device 1801 coupled to various components, such as peripheral devices 1802, 1803, 1801 and the like. These may include components such as input devices 1803 such as voice recognition technologies, touch pads, buttons, keyboards and/or pointing devices, such as a mouse or trackball, that may operate via one or more input/output ("I/O") interfaces 1812. The components of computing device 1801 may include one or more processors (including central processing units ("CPU"), graphics processing units ("GPU"), microprocessors ("μP"), and the like) 1807, system memory 1809, and a system bus 1808 that typically couples the various components. Processor(s) 1807 typically processes or executes various computer-executable instructions and, based on those instructions, controls the operation of computing device 1801. This may include the computing device 1801 communicating with other electronic and/or computing devices, systems or environments (not shown) via various communications technologies such as a network connection 1814 or the like. System bus 1808 represents any number of bus structures, including a memory bus or memory controller, a peripheral bus, a serial bus, an accelerated graphics port, a processor or local bus using any of a variety of bus architectures, and the like.

System memory 1809 may include computer-readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 1809 typically stores data, computer-executable instructions and/or program modules comprising computer-executable instructions that are immediately accessible to and/or presently operated on by one or more of the processors 1807. The term "system memory" as used herein refers strictly to a physical article(s) of manufacture or the like.

Mass storage devices 1804 and 1810 may be coupled to computing device 101 or incorporated into computing device 1801 via, for example, coupling to the system bus. Such mass storage devices 1804 and 1810 may include non-volatile RAM, a magnetic disk drive which reads from and/or writes to a removable, non-volatile magnetic disk (e.g., a "floppy disk") 1805, and/or an optical disk drive that reads from and/or writes to a non-volatile optical disk such as a CD ROM, DVD ROM 1806. Alternatively, a mass storage device, such as hard disk 1810, may include non-removable storage medium. Other mass storage devices may include memory cards, memory sticks, tape storage devices, and the like. The term "mass storage device" as used herein refers strictly to a physical article(s) of manufacture or the like.

Any number of computer programs, files, data structures, control logic, computer-executable instructions, and the like may be stored in mass storage 1810, other storage devices

1804, 1805, 1806 and system memory 1809 (typically limited by available space) including, by way of example and not limitation, operating systems, application programs, data files, directory structures, computer-executable instructions, and the like.

Output components or devices, such as display device 1802, may be coupled to computing device 1801, typically via an interface such as a display adapter 1811. Output device 1802 may be a liquid crystal display ("LCD"). Other example output devices may include printers, audio outputs, voice outputs, cathode ray tube ("CRT") displays, tactile devices or other sensory output mechanisms, or the like. Output devices may enable computing device 1801 to interact with human operators or other machines, systems, computing environments, or the like. A user may interface with computing environment 100 via any number of different I/O devices 1803 such as a touch pad, buttons, keyboard, mouse, joystick, game pad, data port, and the like. These and other I/O devices may be coupled to processor(s) 1807 via I/O interfaces 1812 which may be coupled to system bus 1808, and/or may be coupled by other interfaces and bus structures, such as a parallel port, game port, universal serial bus ("USB"), fire wire, infrared ("OR") port, and the like.

Computing device 1801 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 1801 may be coupled to a network via network adapter 1813 or the like, or, alternatively, via a modem, digital subscriber line ("DSL") link, integrated services digital network ("ISDN") link, Internet link, wireless link, or the like.

Communications connection 1814, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. Byway of example, and not limitation, communications media may include wired media, such as a wired network or direct-wired connection or the like, and wireless media, such as acoustic, radio frequency, infrared, or other wireless communications mechanisms.

Power source 1890, such as a battery or a power supply, typically provides power for portions or all of computing environment 1800. In the case of the computing environment 1800 being a mobile device or portable device or the like, power source 1890 may be a battery. Alternatively, in the case computing environment 1800 is a desktop computer or server or the like, power source 1890 may be a power supply designed to connect to an alternating current ("AC") source, such as via a wall outlet.

Some mobile devices or controllers may include only a few of the components described in connection with FIG. 18. For example, controller 1070 may not include a built-in display, keyboard, or other human-interface devices. But such a controller may include communication mechanisms that facilitate the controller's interaction, local and/or remote, with other more conventional computing devices. Such interaction or communication may be via various kinds of local buses (e.g., USB or the like) and/or via wireless or wired networks include via the Internet.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" as used herein typically includes and refers to executable instructions, code, data, applications, programs, program modules, or the like maintained in an electronic device such as a ROM. The term "software" as used herein typically includes and refers to computer-executable instructions, code, data, applications, programs, program modules, firmware, and the like maintained in or on any form or type of computer-readable media that is configured for storing computer-executable instructions or the like in a manner that may be accessible to a computing device.

The terms "computer-readable medium", "computer-readable media", and the like as used herein and in the claims are limited to referring strictly to one or more statutory apparatus, machine, article of manufacture, or the like that is not a signal or carrier wave per se. Thus, computer-readable media, as the term is used herein, is intended to be and shall be interpreted as statutory subject matter.

The term "computing device" as used herein and in the claims is limited to referring strictly to one or more statutory apparatus, article of manufacture, or the like that is not a signal or carrier wave per se, such as computing device 1801 that encompasses client devices, mobile devices, one or more servers, network services such as an Internet services or corporate network services based on one or more computers, and the like, and/or any combination thereof. Thus, a computing device, as the term is used herein, is also intended to be and shall be interpreted as statutory subject matter.

Nitrogen reduction. In general, substrate that is rich in nitrogen compounds, particularly ammonia, tends to inhibit the anaerobic digestion process typically performed by system 1000. Such inhibition may be referred to as nitrogen toxicity or ammonia toxicity. The term "nitrogen compounds" as used herein includes but is not limited to organic and inorganic nitrogen, ammonia, ammonium, nitrates, and nitrites. In one example, poultry manure may be sufficiently rich in nitrogen compounds so as to inhibit the anaerobic digestion process. The term "nitrogen-rich substrate" as used herein typically refers to a substrate with an ammonia concentration sufficient to inhibit the anaerobic digestion process typically performed by system 1000. In one example, a substrate with an ammonia concentration in excess of about three thousand (3,000) parts per million (ppm) is sufficiently nitrogen-rich to inhibit the anaerobic digestion process performed by system 1000. In another example, a substrate with an ammonia concentration in excess of about six thousand (6,000) ppm is sufficiently nitrogen-rich to inhibit the anaerobic digestion process performed by system 1000. The term "nitrogen compound" as used herein typically includes any organic and inorganic compound that includes nitrogen, including but not limited to ammonia, ammonium, nitrates, and nitrites in their various forms.

Nitrogen reduction systems. In order to minimize the inhibiting effects of nitrogen-rich substrate on system 1000, one or more nitrogen reduction systems may be employed that are configured to reduce the amount of one or more nitrogen compounds in a substrate or a substrate mixture. In some examples, the amount of nitrogen is reduced below a toxicity threshold. In one such example, the toxicity threshold for one or more nitrogen compounds is about three thousand (3,000) ppm. In another such example, the toxicity threshold for one or more nitrogen compounds is about six thousand (6,000) ppm. In other examples, one or more nitrogen compounds in a substrate mixture may be reduced by a nitrogen reduction system sufficient to result in uninhibited anaerobic digestion by system 1000 based on one or more factors other than, or including, a particular toxicity threshold. In some examples, such factors may include a pH of the substrate mixture, a flow rate (e.g., $Q_1$ or $Q_2$), a rate at which gas is produced (e.g., methane or hydrogen), or other factors detectable and/or controllable by controller 1070.

In some examples, a nitrogen reduction system reduces the amount of one or more nitrogen compounds in a substrate mixture sufficient to procedure a non-toxic substrate mixture. The term "non-toxic substrate mixture" as used herein refers to a substrate mixture with one or more nitrogen compounds being sufficiently low that, for purposes of anaerobic digestion by system 1000, the anaerobic digestion process is considered uninhibited. Stated another way, the non-toxic substrate mixture is considered non-toxic with respect to anaerobic digestion of the non-toxic substrate by system 1000.

In one example, a nitrogen-rich substrate mixture that has had the amount of ammonia it contains reduced below a toxicity threshold is considered a non-toxic substrate mixture. Example nitrogen reduction systems 1900, 2000, and 2100 described below are examples of systems configured for converting nitrogen-rich substrates or substrate mixtures into non-toxic substrates or substrate mixtures either before or during the anaerobic digestion process typically performed by system 1000.

Figure 19:
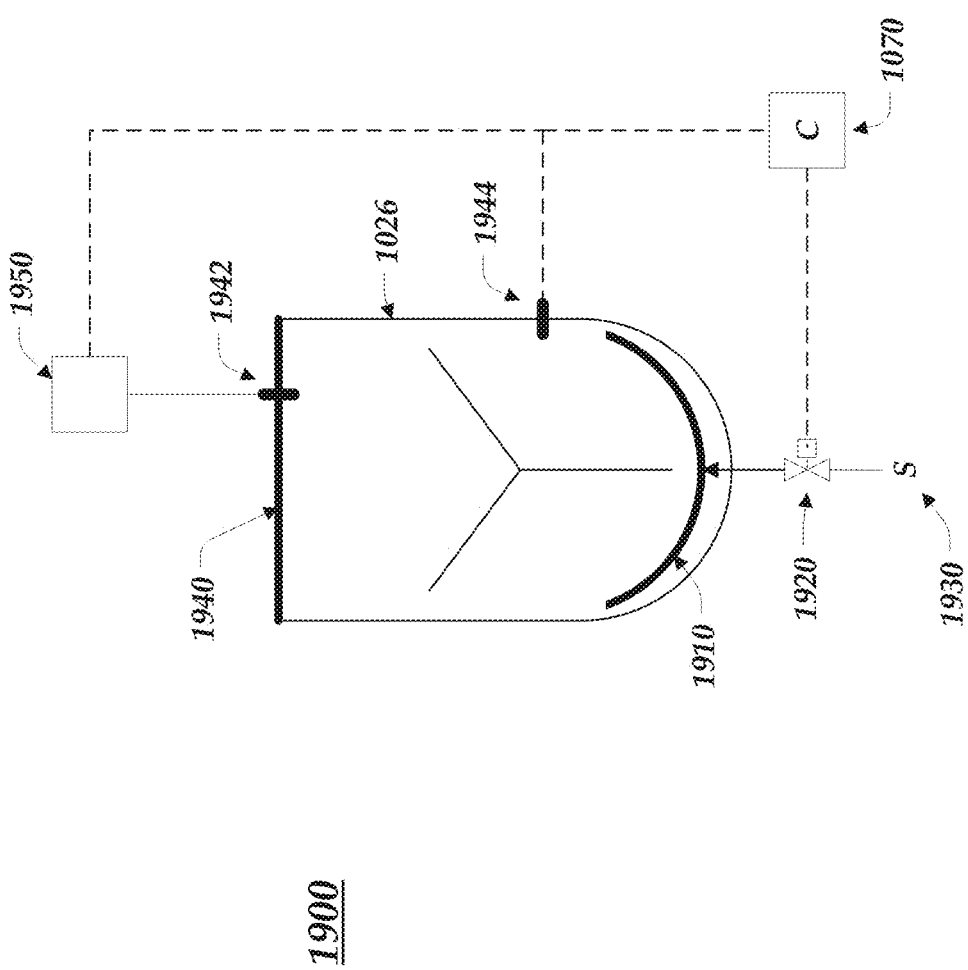
FIG. 19 is a schematic diagram that illustrates example nitrogen reduction system 1900.

FIG. 19 is a schematic diagram that illustrates example nitrogen reduction system ("NRS") 1900 that is configured for reducing an amount of at least one nitrogen compound in a substrate or substrate mixture within one or more substrate mixers (such as mixer 1026), resulting in a non-toxic substrate mixture within such mixers.

NRS 1900 comprises mixer 1026 and its association components, controller 1070, sparger 1910, sparging control valve 1920, sparging input 1930, optional mixer cover 1940, optional gas collection port 1942, optional sensor(s) 1944, and optional gas collector 1950. In some examples of NRS 1900, mixer 1026 is configured for producing a substrate mixture by mixing macerated substrate with water and/or second-stage effluent as described above, where the macerated substrate includes at least some nitrogen-rich substrate.

NRS 1900 is typically configured to sparge the substrate mixture in mixer 1026. Sparging input 1930 is typically coupled to a source of sparging gas. In one example, ambient air or any chemically inert gas, or any combination of ambient air and/or such gases, may be used as the sparging gas. In another example, steam may be used as the sparging gas. In yet another example, gas(es) collected in gas collector 1950 may be used as the sparging gas or may be combined with ambient air, inert gas(es), and/or steam and may be used as the sparging gas.

In some examples, the sparging gas flows through sparging control valve 1920 and into sparger 1910 under the control of controller 1070 as indicated by the dashed line between the two. In some examples, controller 1070 is configured to enable or disable the flow of the sparging gas into mixer 1026, control the rate at which the sparging gas flows, and/or control the pressure of the sparging gas. Controller 1070 may also control the temperature of the sparging gas. In some examples, controller 1070 is also configured to control the temperature of the substrate mixture in mixer 1026. In this example, the controller may maintain the substrate mixture at a temperature of up to about 100 degrees Celsius during sparging.

In some examples, sparger 1910 is configured to inject sparging gas into the substrate mixture in mixer 1026. Sparging may occur while the substrate is being mixed and/or while mixing has stopped. In some examples, at least one sparger 1910 is disposed so as to inject the sparging gas into the substrate mixture from one or more locations at or near the lower half of mixer 1026. In other examples, sparger 1910 is configured to diffuse the sparging gas into and/or throughout the substrate mixture in mixer 1026. The verb "inject" in its various forms as used herein typically encompasses the verb "diffuse" in it various forms as used herein.

In some examples, sensor(s) 1944 represents a pH sensor(s) that detects the pH of the substrate mixture in mixer 1026, and is coupled to controller 1070 as indicated by the dashed line between the two. Additionally or alternatively, sensor(s) 1944 may also represent a nitrogen compound sensor(s) that detects an amount or concentration of ammonia and/or other nitrogen compounds in the substrate mixture. Controller 1070 may obtain the detected pH and/or nitrogen compound information from sensor(s) 1944 and may control NRS 1900 based at least in part on this information.

In some examples, optional mixer cover 1940 is not used and gases bubbling to the top of the substrate may be allowed to flow out of the mixer. In other examples, cover 1940 is a part of mixer 1026 or is added to the mixer so as to enable the collection of at least a portion of gases that bubble up through the substrate mixture as a result of the sparging. In some examples, the collected gases pass through gas collection port 1942 and are collected in gas collector 1950.

NRS 1900 may be used alone in mixer 1026, or in conjunction with NRS 2000 and/or NRS 2100.

Figure 20:
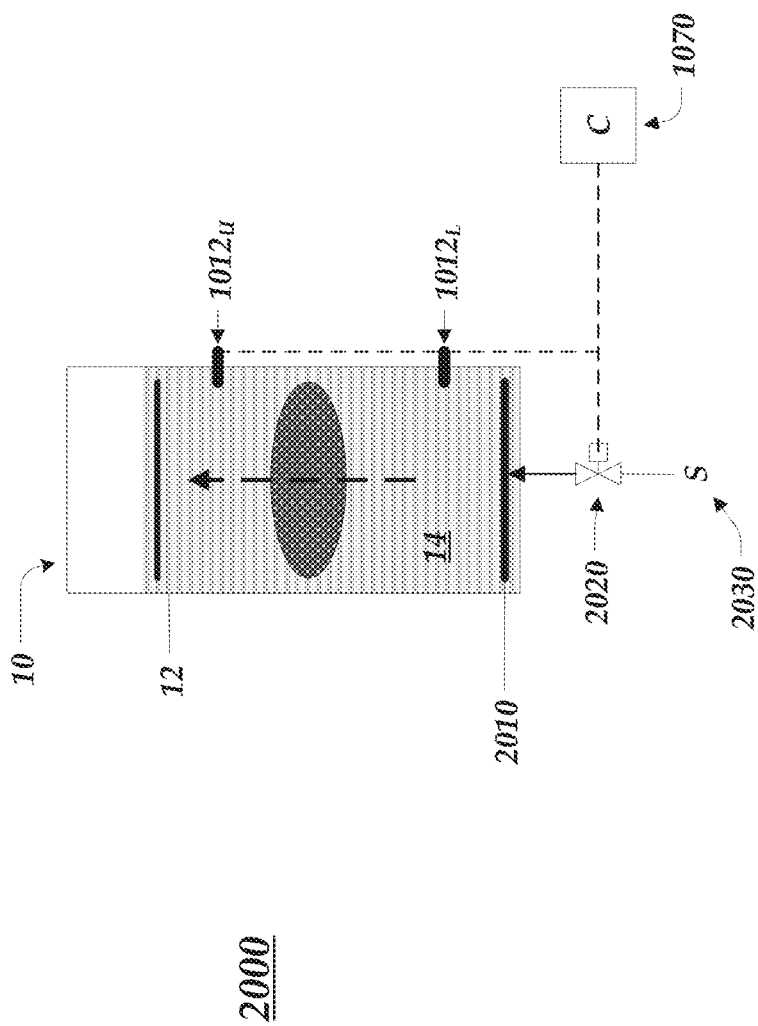
FIG. 20 is a schematic diagram that illustrates example nitrogen reduction system 2000.

FIG. 20 is a schematic diagram that illustrates example nitrogen reduction system ("NRS") 2000 that is configured for reducing an amount of at least one nitrogen compound in a substrate or substrate mixture within one or more reactor vessels (such as reactor vessel $12_1$ and/or reactor vessel $12_2$), resulting in a non-toxic substrate mixture within such vessels.

NRS 2000 comprises anaerobic bioreactor 10 (which may be first-stage anaerobic bioreactor $10_1$ and/or second-stage anaerobic bioreactor $10_2$) along with its associated components (including vessel 12), controller 1070, sparger 2010, sparging control valve 2020, sparging input 2030, and sensors 1012.

NRS 2000 is typically configured to sparge the substrate mixture 14 in vessel 12. Sparging input 2030 is typically coupled to a source of sparging gas. In one example, ambient air or any chemically inert gas, or any combination of ambient air and/or such gases, may be used as the sparging gas. In another example, steam may be used as the sparging gas. In yet another example, gas(es) collected in gas collector 1950 may be used as the sparging gas or may be combined with ambient air, inert gas(es), and/or steam and may be used as the sparging gas.

In some examples, the sparging gas flows through sparging control valve 2020 and into sparger 2010 under the control of controller 1070 as indicated by the dashed line between the two. In some examples, controller 1070 is configured to enable or disable the flow of the sparging gas into vessel 12, control the rate at which the sparging gas flows, and/or control the pressure of the sparging gas. Controller 1070 may also control the temperature of the sparging gas. In some examples, controller 1070 is also configured to control the temperature of the substrate mixture 14 in vessel 12. In these example, the controller may maintain the substrate mixture at a temperature of up to about 100 degrees Celsius during sparging.

In some examples, sparger 2010 is configured to inject sparging gas into substrate mixture 14 in vessel 12. Sparging of the substrate mixture may occur during the anaerobic digestion process within vessel 12 and/or while digestion has stopped. In some examples, one or more sparger 2010 is disposed so as to inject the sparging gas into the substrate mixture from one or more locations at or near the lower half of vessel 12. In other examples, sparger 2010 is configured to diffuse the sparging gas into and/or throughout the substrate mixture 14 in vessel 12.

In some examples, sensors 1012 represent pH sensors that detect the pH of the substrate mixture in vessel 12 as described in connection with FIG. 15, and are coupled to controller 1070 as indicated by the dashed line between them. Additionally or alternatively, sensors 1012 may also represent one or more nitrogen compound sensors that detect an amount or concentration of ammonia and/or other nitrogen compounds in the substrate mixture. Controller 1070 may obtain the detected pH and/or nitrogen compound information from sensors 1012 and may control NRS 2000 based at least in part on this information.

NRS 2000 may be used alone in first stage anaerobic bioreactor $10_1$ and/or first stage anaerobic bioreactor $10_2$, or in conjunction with NRS 1900 and/or NRS 2100.

Figure 21:
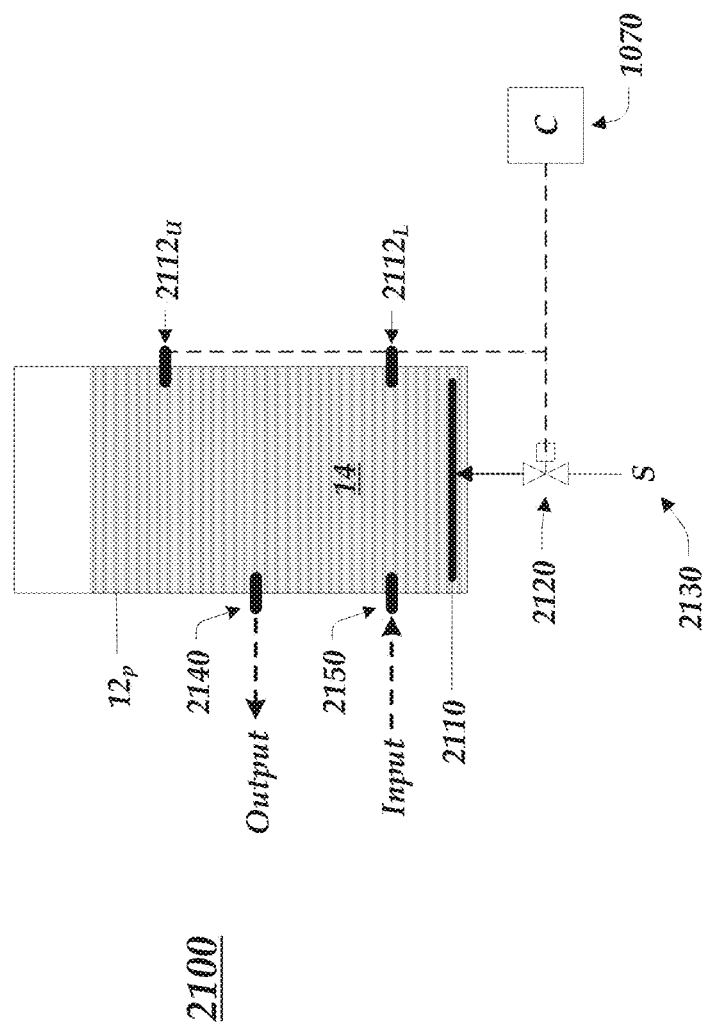
FIG. 21 is a schematic diagram that illustrates example nitrogen reduction system 2100.

FIG. 21 is a schematic diagram that illustrates example nitrogen reduction system ("NRS") 2100 that is configured for reducing an amount of at least one nitrogen compound in a substrate or substrate mixture within one or more pre-processing vessels (such as pre-processing vessel $12_p$), resulting in a non-toxic substrate mixture within such vessel(s).

NRS 2100 comprises one or more pre-processing vessels (such as vessel $12_p$) along with other associated components not shown, controller 1070, sparger 2110, sparging control valve 2120, sparging input 2130, one or more sensors (such as sensors $2112_U$ and $2112_L$), substrate mixture input port 2150, and substrate mixture output port 2140.

In general, NRS 2100 is inserted between a first-stage feeder system, such as system 1100 illustrated in FIG. 11, and a first-stage reactor system, such as system 1200 illustrated in FIG. 12. In one example of such an insertion, the output side of conduit 1074b of system 1100 is coupled to substrate mixture input port 2150 with substrate mixture output port 2140 coupled to substrate inlet $16_1$ of system 1200 via a suitable feeder system such as, for example, a system similar to feeder system 1300 illustrated in FIG. 13.

In one example, NRS 2100 comprises a single vessel $12_p$. In another example, NRS 2100 comprises a plurality of vessels such as vessel $12_p$ that are coupled together in parallel. In another example, NRS 2100 comprises a plurality of vessels such as vessel $12_p$ that are coupled together in series. In yet another example, NRS 2100 comprises a plurality of vessels such as vessel $12_p$ with a combination of parallel-coupled and series-coupled vessels.

Substrate mixture input port 2150 is typically located in the bottom or the lower portion of vessel $12_p$, but may be located in any suitable location. Substrate mixture output port 2140 is typically located in the lower portion of vessel $12_p$, but may also be located in any suitable location.

NRS 2100 is typically configured to sparge the substrate mixture 14 in vessel $12_p$. Sparging input 2130 is typically coupled to a source of sparging gas. In one example, ambient air or any chemically inert gas, or any combination of ambient air and/or such gases, may be used as the sparging gas. In another example, steam may be used as the sparging gas. In yet another example, gas(es) collected in gas collector 1950 may be used as the sparging gas or may be combined with ambient air, inert gas(es), and/or steam and may be used as the sparging gas.

In some examples, the sparging gas flows through sparging control valve 2120 and into sparger 2110 under the control of controller 1070 as indicated by the dashed line between the two. In some examples, controller 1070 is configured to enable or disable the flow of the sparging gas into vessel $12_p$, control the rate at which the sparging gas flows, and/or control the pressure of the sparging gas. Controller 1070 may also control the temperature of the sparging gas.

In some examples, sparger 2110 is configured to inject sparging gas into substrate mixture 14 in vessel $12_p$. In some examples, one or more sparger 2110 is disposed so as to inject the sparging gas into the substrate mixture from one or more locations at or near the lower half of vessel 12. In other examples, sparger 2110 is configured to diffuse the sparging gas into and/or throughout the substrate mixture 14 in vessel $12_p$.

NRS 2100 may include one or more sensors, such as sensors 2112. Such sensors may be attached to or located through or within vessel $12_p$ in any suitable location. In some examples, sensors 2112 represent pH sensors that detect the pH of the substrate mixture at one or more locations in vessel $12_p$, and are coupled to controller 1070 as indicated by the dashed lines between them. Additionally or alternatively, sensors 2112 may also represent one or more nitrogen compound sensors that each detect an amount or concentration of ammonia and/or other nitrogen compounds in the substrate mixture. Controller 1070 may obtain the detected pH and/or nitrogen compound information from sensors 2112 and may control NRS 2100 based at least in part on this information.

NRS 2100 may be used alone in one or more pre-processing stages, or in conjunction with NRS 1900 and/or NRS 2000.

Figure 22:
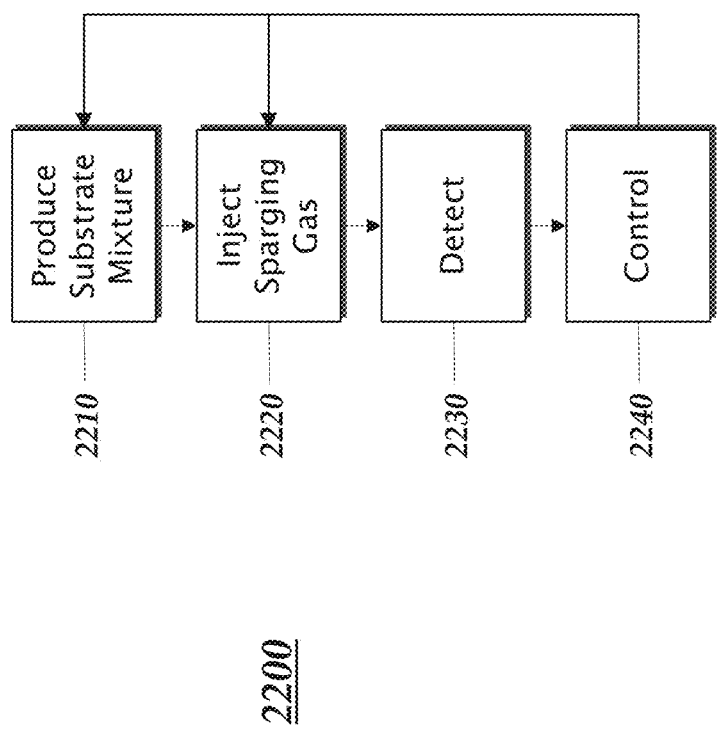
FIG. 22 is a diagram illustrating example method 2200 for reducing an amount of at least one nitrogen compound in a substrate or substrate mixture resulting in a non-toxic substrate mixture for purposes of anaerobic digestion by system 1000.

Nitrogen reduction method. FIG. 22 is a diagram illustrating example method 2200 for reducing an amount of at least one nitrogen compound in a substrate or substrate mixture resulting in a non-toxic substrate mixture for purposes of anaerobic digestion by system 1000. In general, the process of such reducing is known herein as a "nitrogen reduction process" which is typically performed by one or more nitrogen reduction systems such as NRS 1900, 2000, and 2100.

Block 2210 typically indicates producing a substrate mixture as described in connection with FIG. 11. In some examples, the substrate mixture comprises nitrogen-rich substrate that is toxic to anaerobic digestion by system 1000. In some examples, the production of substrate mixture continues during other steps of method 2100, subject to control by controller 1070.

Block 2220 typically indicates injecting or diffusing, by a nitrogen reduction system such as NRS 1900, 2000, or 2100, sparging gas (such as described in connection with FIGS. 19, 20, and/or 21) into the substrate mixture. In some examples, the sparging gas is injected or diffused into the substrate mixture, or a portion thereof, that is located in mixer 1026, in vessel $12_1$ or $12_2$, and/or in pre-processing vessel $12_p$. In some examples, the sparging gas flows through a sparging input from a sparging gas source, through a sparging control valve, and into a sparger under the control of controller 1070, which is configured to enable or disable the flow of the sparging gas, control the rate at which the sparging gas flows, control the pressure of the sparging gas, and/or control the temperature of the sparging gas. In some examples, the injection or diffusion of sparging gas into the substrate mixture continues during other steps of method 2100, subject to control by controller 1070.

Block 2230 typically indicates detecting, by controller 1070, one or more factors such as an amount or concentration of one or more nitrogen compounds in the substrate mixture, a pH of the substrate mixture, a flow rate (e.g., $Q_1$ or $Q_2$), a rate at which gas is produced (e.g., methane and/or hydrogen), or other factors detectable and/or controllable by controller 1070. In some examples, the detecting is performed in a substantially continuous manner, typically under control of controller 1070. In other examples, the detecting is performed on a periodic or on an as-needed basis, typically under control of controller 1070. In some examples, the detecting continues during other steps of method 2100, subject to control by controller 1070.

Block 2240 typically indicates controlling, by controller 1070, the nitrogen reduction process. In some examples, such controlling includes controlling the production of a substrate mixture (e.g., block 2210) and/or the injecting or diffusing of sparging gas into the substrate mixture, or a portion thereof, that is located in mixer 1026, in vessel $12_1$ or $12_2$, and/or in pre-processing vessel $12_p$ (e.g., block 2220), based at least on factors such as those described in connection with block 2230. Such controlling may involve the control of one or more flow rates, pressures, temperatures, the detecting of various factors, and/or other aspects of the processes involved in the operation of system 1000 described herein. In general, such controlling continues throughout the nitrogen reduction process.

While this invention has been described with reference to certain specific embodiments and examples, those skilled in the art will recognize that many variations are possible without departing from the scope and spirit of this invention. The invention, as defined by the claims, is intended to cover all changes and modifications of the invention which do not depart from the spirit of the invention. The words "including" and "having," as used in the specification, including the claims, shall have the same meaning as the word "comprising."

CONCLUSION

In a first example, a multi-stage anaerobic bioreactor processing system comprises: a vessel configured for inducing a sludge bed; a mixer configured for producing a substrate mixture from at least macerated substrate that includes at least some nitrogen-rich substrate, the mixer comprising a nitrogen reduction system configured for reducing an amount of at least one nitrogen compound in the substrate mixture resulting in a non-toxic substrate mixture for purposes of anaerobic digestion by the IBR system; and at least a portion of a feeder system configured for feeding at least a portion of the non-toxic substrate mixture into the vessel.

In the first example, the at least one nitrogen compound is ammonia; the nitrogen reduction system is further configured for reducing the amount of the at least one nitrogen compound in the substrate mixture below a toxicity threshold that is six thousand (6,000) parts per million or three thousand (3,000) parts per million; the nitrogen reduction system comprises a sparger coupled to a source of sparging gas and configured for injecting the sparging gas into the substrate mixture in the mixer; the nitrogen reduction system comprises a mixer cover, a gas collection port, and a gas collector, wherein the combination of the mixer, the mixer cover, the gas collection port, and the gas collector are configured for collecting gasses resulting from injection of sparging gas into the substrate mixture; the nitrogen reduction system is further configured for recirculating at least a portion of gasses collected in the gas collector as at least a portion of the sparging gas; and the nitrogen reduction system comprises a sensor that is configured for detecting a pH of the substrate mixture or an amount or concentration of a nitrogen compound in the substrate mixture, the sensor coupled to a controller that is configured for controlling the nitrogen reduction system based at least in part on the detected pH of the substrate mixture or the amount or concentration of the nitrogen compound in the substrate mixture.

In a second example, a multi-stage anaerobic bioreactor processing system comprises: a plurality of vessels, at least one of which is configured for inducing a sludge bed; a portion of a feeder system configured for feeding a substrate mixture into one of the plurality of vessels; and the one of the plurality of vessels comprising a nitrogen reduction system configured for reducing an amount of at least one nitrogen compound in the substrate mixture resulting in a non-toxic substrate mixture with respect to anaerobic digestion of the non-toxic substrate by the IBR system.

In the second example, the at least one nitrogen compound is ammonia; the nitrogen reduction system is further configured for reducing the amount of the at least one nitrogen compound in the substrate mixture below a toxicity threshold that is six thousand (6,000) parts per million or three thousand (3,000) parts per million; the nitrogen reduction system comprises a sparger coupled to a source of sparging gas and configured for injecting the sparging gas into the substrate mixture in the one of the plurality of vessels; the one of the plurality of vessels is the vessel of a first-stage reactor of the IBR system, the vessel of a second-stage reactor of the IBR system, or the vessel of a pre-processing stage of the IBR system; and the nitrogen reduction system comprises a sensor that is configured for detecting a pH of the substrate mixture or an amount or concentration of a nitrogen compound in the substrate mixture, the sensor coupled to a controller that is configured for controlling the nitrogen reduction system based at least in part on the detected pH of the substrate mixture or the amount or concentration of the nitrogen compound in the substrate mixture.

In a third example, a method of reducing an amount of a nitrogen compound within a substrate mixture in an induced bed bioreactor ("IBR") system comprises: producing, by a mixer of the IBR system, a substrate mixture that comprises nitrogen-rich substrate; injecting, by a nitrogen reduction system of the IBR system, sparging gas into at least a portion of the substrate mixture resulting in a non-toxic substrate mixture that is considered non-toxic with respect to anaerobic digestion of the non-toxic substrate by the IBR system.

In the third example, the sparging gas is injected into the at least a portion of the substrate mixture that is located within the mixer; the sparging gas is injected into the at least a portion of the substrate mixture that is located within a reactor vessel of the IBR system; the sparging gas is injected into the at least a portion of the substrate mixture that is located within a pre-processing vessel of the IBR system; the nitrogen compound is ammonia; the method further comprises detecting, via a sensor of the IBR system, a pH of the at least a portion of the substrate mixture or an amount or concentration of a nitrogen compound in the substrate mixture, and controlling, by a controller of the IBR system, operation of the nitrogen reduction system based at least in part on the detected pH of the at least a portion of the substrate mixture or the amount or concentration of the nitrogen compound in the substrate mixture; and the sparging gas comprises ambient air, a chemically inert gas, or steam.

The invention claimed is:

1. An induced bed bioreactor ("IBR") system comprising:
a vessel configured for inducing a sludge bed;
a nitrogen reduction system configured for reducing an amount of at least one nitrogen compound in a substrate mixture below a toxicity threshold that is six thousand (6,000) parts per million resulting in a non-toxic substrate mixture for purposes of anaerobic digestion by the IBR system; and
at least a portion of a feeder system configured for feeding at least a portion of the non-toxic substrate mixture into the vessel.

2. The IBR system of claim 1 wherein the at least one nitrogen compound is ammonia, ammonium, a nitrate, or a nitrite; or wherein the at least one nitrogen compound comprises organic nitrogen or inorganic nitrogen.

3. The IBR system of claim 1 wherein the toxicity threshold is three thousand (3,000) parts per million.

4. The IBR system of claim 1, the nitrogen reduction system comprising a sparger coupled to a source of sparging gas and configured for injecting the sparging gas into the substrate mixture.

5. The IBR system of claim 4, the nitrogen reduction system further comprising a controller configured for controlling a temperature of the sparging gas.

6. The IBR system of claim 4, the nitrogen reduction system further comprising a controller configured for controlling a temperature of the substrate mixture.

7. The IBR system of claim 1, the nitrogen reduction system comprising a sensor that is configured for detecting a pH of the substrate mixture or an amount or concentration of a nitrogen compound in the substrate mixture, the sensor coupled to a controller that is configured for controlling the nitrogen reduction system based at least in part on the detected pH of the substrate mixture or the amount or concentration of the nitrogen compound in the substrate mixture.

8. An induced bed bioreactor ("IBR") system comprising:
a plurality of vessels, at least one of which is configured for inducing a sludge bed;
a portion of a feeder system configured for feeding a substrate mixture into one of the plurality of vessels; and
a nitrogen reduction system configured for reducing an amount of at least one nitrogen compound in the substrate mixture below a toxicity threshold that is six thousand (6,000) parts per million resulting in a non-toxic substrate mixture with respect to anaerobic digestion of the non-toxic substrate by the IBR system.

9. The IBR system of claim 8 wherein the at least one nitrogen compound is ammonia, ammonium, a nitrate, or a nitrite; or wherein the at least one nitrogen compound comprises organic nitrogen or inorganic nitrogen.

10. The IBR system of claim 8 wherein the toxicity threshold is three thousand (3,000) parts per million.

11. The IBR system of claim 8, the nitrogen reduction system comprising a sparger coupled to a source of sparging gas and configured for injecting the sparging gas into the substrate mixture.

12. The IBR system of claim 11, the nitrogen reduction system further comprising a controller configured for controlling a temperature of the sparging gas or of the substrate mixture.

13. The IBR system of claim 8, the nitrogen reduction system comprising a sensor that is configured for detecting a pH of the substrate mixture or an amount or concentration of a nitrogen compound in the substrate mixture, the sensor coupled to a controller that is configured for controlling the nitrogen reduction system based at least in part on the detected pH of the substrate mixture or the amount or concentration of the nitrogen compound in the substrate mixture.

14. A method of reducing an amount of a nitrogen compound within a substrate mixture in an induced bed bioreactor ("IBR") system, the method comprising:
injecting, by a nitrogen reduction system of the IBR system, sparging gas into at least a portion of a substrate mixture resulting in a non-toxic substrate mixture that is considered non-toxic with respect to anaerobic digestion of the non-toxic substrate by the IBR system;
detecting, via a sensor of the IBR system, a pH of the at least a portion of the substrate mixture or an amount or concentration of the nitrogen compound in the substrate mixture; and
controlling, by a controller of the IBR system, operation of the nitrogen reduction system based at least in part on the detected pH of the at least a portion of the substrate mixture or the amount or concentration of the nitrogen compound in the substrate mixture.

15. The method of claim 14 wherein the sparging gas is injected into the at least a portion of the substrate mixture that is located within a mixer of the IBR system.

16. The method of claim 14 wherein the sparging gas is injected into the at least a portion of the substrate mixture that is located within a reactor vessel of the IBR system.

17. The method of claim 14 wherein the sparging gas is injected into the at least a portion of the substrate mixture that is located within a pre-processing vessel of the IBR system.

18. The method of claim 14 wherein the nitrogen compound is ammonia, ammonium, a nitrate, or a nitrite; or wherein the at least one nitrogen compound comprises organic nitrogen or inorganic nitrogen.

19. The method of claim 14 further comprising:
   reducing, via the nitrogen reduction system of the IBR system, the amount or concentration of the nitrogen compound below a toxicity threshold that is: six thousand (6,000) parts per million; or three thousand (3,000) parts per million.

20. The method of claim 14 wherein the sparging gas comprises: ambient air; a chemically inert gas; or steam.

* * * * *